United States Patent
Chong et al.

(10) Patent No.: US 12,184,507 B2
(45) Date of Patent: Dec. 31, 2024

(54) DATA PROCESSING METHOD AND APPARATUS

(71) Applicant: HUAWEI TECHNOLOGIES CO., LTD., Guangdong (CN)

(72) Inventors: Weiwei Chong, Shenzhen (CN); Yang Xin, Shanghai (CN); Xiaobo Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/145,129

(22) Filed: Dec. 22, 2022

(65) Prior Publication Data

US 2023/0127558 A1  Apr. 27, 2023

Related U.S. Application Data

(63) Continuation of application No. PCT/CN2021/096496, filed on May 27, 2021.

(30) Foreign Application Priority Data

Jun. 23, 2020 (CN) .......................... 202010581678.9

(51) Int. Cl.
H04L 41/14 (2022.01)
(52) U.S. Cl.
CPC ................. *H04L 41/145* (2013.01)
(58) Field of Classification Search
CPC ....... H04L 41/145; H04L 41/16; H04L 41/14; H04L 41/34; H04L 43/022
See application file for complete search history.

(56) References Cited

U.S. PATENT DOCUMENTS

| | | | |
|---|---|---|---|
| 2016/0350671 A1* | 12/2016 | Morris, II | G05B 23/0229 |
| 2018/0336486 A1* | 11/2018 | Chu | G06N 20/00 |
| 2018/0376516 A1* | 12/2018 | Bandlamudi | H04L 69/164 |

(Continued)

FOREIGN PATENT DOCUMENTS

| | | |
|---|---|---|
| CN | 109243618 A | 1/2019 |
| CN | 109784391 A | 5/2019 |

(Continued)

OTHER PUBLICATIONS

International Search Report and Written Opinion issued in PCT/CN2021/096496, dated Aug. 13, 2021, 9 pages.

(Continued)

*Primary Examiner* — Fadi Haj Said

(57) ABSTRACT

A data processing method and an apparatus relate to the communication field. The data processing method includes: A first network data analytics network element determines identification information of one or more submodels related to a target model. The first network data analytics network element sends the identification information of the submodel to a network element corresponding to the identification information of the submodel. The first network data analytics network element receives, from the network element, a value that reflects impact of the submodel on the target model, and performs training, to obtain the target model. The data processing method and apparatus provide functions such as accurate data collection, data analysis, and data training.

20 Claims, 8 Drawing Sheets

(56) References Cited

U.S. PATENT DOCUMENTS

2020/0196155 A1\* 6/2020 Bogineni ............ H04W 28/082
2023/0146099 A1\* 5/2023 Ouyang ............. H04L 41/0806
　　　　　　　　　　　　　　　　　　　　　709/223

FOREIGN PATENT DOCUMENTS

| CN | 110417565 A | 11/2019 |
| CN | 110569288 A | 12/2019 |
| CN | 110831029 A | 2/2020 |
| CN | 110929886 A | 3/2020 |
| CN | 110972208 A | 4/2020 |
| WO | 2019158737 A1 | 8/2019 |

OTHER PUBLICATIONS

Office Action issued in CN202010581678.9, dated Apr. 18, 2022, 13 pages.
Notice of Allowance issued in CN202010581678.9, dated Sep. 5, 2022, 4 pages.
3GPP TR 23.700-91 V0.4.0 (Jun. 2020), 3rd Generation Partnership Project; Technical Specification Group Services and System Aspects; Study on enablers for network automation for the 5G System (5GS); Phase 2(Release 17), 186 pages.
China Mobile, AsiaInfo, CATT, KI #2, New Sol, Federated Learning among Multiple NWDAF Instances. 3GPP TSG-WG SA2 Meeting #139E e-meeting, Elbonia, Jun. 1-12, 2020, S2-2004029r03, 5 pages.
Extended European Search Report dated Oct. 13, 2023, issued for European Application No. 21829772.9 (12 pages).

\* cited by examiner

DATA PROCESSING METHOD AND APPARATUS

CROSS-REFERENCE TO RELATED APPLICATIONS

This application is a continuation of International Application No. PCT/CN2021/096496, filed on May 27, 2021, which claims priority to Chinese Patent Application No. 202010581678.9, filed on Jun. 23, 2020. The disclosures of the aforementioned applications are hereby incorporated by reference in their entireties.

TECHNICAL FIELD

This disclosure relates to communication technologies, and in particular, to a data processing method and an apparatus.

BACKGROUND

Since R15 of 3rd generation partnership project (3GPP) standards, a network data analytics function (NWDAF) network element is introduced into a communication network. The NWDAF network element is configured to provide functions such as data collection, data analysis, and data training. The NWDAF network element can feed back a data analysis result to a network function (NF) network element, a third-party application function (AF) network element, or an operation, administration and maintenance (OAM) network element in a network, so that the NF network element, the AF network element, or the OAM network element implements or enhances a service procedure based on the data analysis result. For example, a session management function (SMF) network element enhances UPF network element selection based on a data analysis result, fed back by the NWDAF network element, of a user plane function (UPF) network element. For another example, a policy control function (PCF) network element enhances a quality of service (QoS) parameter based on a data analysis result, fed back by the NWDAF network element, of a service mean opinion score (MOS) of an application.

Usually, due to various privacy or security concerns, data between an operator network and a third party cannot be completely exposed, and even data between domains in the operator network cannot be completely exposed. As a result, a data isolation problem occurs.

Due to the data isolation problem, it is difficult to implement common data collection and centralized data analysis and training, and therefore the NWDAF network element cannot provide functions such as accurate data collection, data analysis, and data training.

SUMMARY

Embodiments of this disclosure provide a data processing method and an apparatus. When a plurality of network elements do not exchange original data, a network data analytics network element may train a target model by using an output result that is obtained through calculation by the plurality of network elements and that reflects a value of impact of a local model in a network element on the target model, to avoid data leakage and obtain a comprehensive and accurate target model, so that functions such as accurate data collection, data analysis, and data training can be provided.

According to a first aspect, an embodiment of this disclosure provides a data processing method. The method includes: A first network data analytics network element determines identification information of one or more submodels related to a target model. The first network data analytics network element sends a first request message to a network element corresponding to the identification information of the submodel, where the first request message includes the identification information of the submodel. The first network data analytics network element receives a first response message from the network element, where the first response message includes a first output result obtained through calculation by the network element by using the submodel, and the first output result reflects a value of impact of the submodel on the target model. The first network data analytics network element obtains the target model through training that is based on the first output result of one or more network elements corresponding to the identification information of the one or more submodels. In this way, when a plurality of network elements do not exchange original data, a network data analytics network element may train a target model by using an output result that is obtained through calculation by the plurality of network elements and that reflects a value of impact of a local model in a network element on the target model, to avoid data leakage and obtain a comprehensive and accurate target model, so that functions such as accurate data collection, data analysis, and data training can be provided.

In a possible implementation, that a first network data analytics network element determines identification information of one or more submodels related to a target model includes: The first network data analytics network element determines, based on a local configuration, the identification information of the one or more submodels related to the target model. Alternatively, the first network data analytics network element determines a network element that is related to the target model and that has a confidentiality requirement; and obtains the identification information of the one or more submodels from the network element having the confidentiality requirement.

In a possible implementation, the first request message further includes one or more of the following: first slice identification information, first service identification information, first area information, first time information, first terminal identification information, first network device identification information, first model training algorithm information, first model feedback validity time information, or first model convergence condition information. The first slice identification information indicates to provide an output result corresponding to the first slice identification information. The first service identification information indicates to provide an output result corresponding to the first service identification information. The first area information indicates to provide an output result corresponding to the first area information. The first time information indicates to provide an output result corresponding to the first time information. The first terminal identification information indicates to provide an output result corresponding to the first terminal identification information. The first network device identification information indicates to provide an output result corresponding to the first network device identification information. The first model training algorithm information is for recommending a model training algorithm to be used for the submodel. The first model feedback validity time information indicates a validity time period for feeding back an output result. The first model convergence condition information indicates a model training convergence condition.

In a possible implementation, the first response message further includes one or more of the following: the identification information of the submodel, association information, a quantity N of iterations, second model training algorithm information, second slice identification information, second service identification information, or second area information. The association information is for associating output results of a same sample object. The quantity N of iterations indicates that an output result of the network element corresponding to the identification information of the submodel is a result generated in an $N^{th}$ iteration process. The second model algorithm information indicates an algorithm used by the network element corresponding to the identification information of the submodel. The second slice identification information indicates that the output result of the network element corresponding to the identification information of the submodel includes an output result for the second slice identification information. The second service identification information indicates that the output result of the network element corresponding to the identification information of the submodel includes an output result for the second service identification information. The second area information indicates that the output result of the network element corresponding to the identification information of the submodel includes an output result for the second area information.

In a possible implementation, the association information includes one or more of the following: an interface identifier, an N2 tunnel identifier, an N3 tunnel identifier, association time information, a quality of service flow identifier QFI, an internet protocol IP 5-tuple, an international mobile subscriber identity IMSI, a generic public subscription identifier GPSI, or a subscriber permanent identifier SUPI. Alternatively, the association information includes an association indication and one or more of the following information: an interface identifier, an N2 tunnel identifier, an N3 tunnel identifier, association time information, a quality of service flow identifier QFI, an internet protocol IP 5-tuple, an international mobile subscriber identity IMSI, a generic public subscription identifier GPSI, or a subscriber permanent identifier SUPI.

In a possible implementation, that the first network data analytics network element obtains the target model through training that is based on the first output result of one or more network elements corresponding to the identification information of the one or more submodels includes: The first network data analytics network element inputs the first output result of the one or more network elements to a preset model. The first network data analytics network element adjusts the preset model based on a loss function difference between sample label data and an output result of the preset model until the loss function difference between the sample label data and the output result of the preset model meets a condition, to obtain the target model.

In a possible implementation, the method further includes: The first network data analytics network element sends the loss function difference to the network element corresponding to the identification information of the one or more submodels, where the network element corresponding to the identification information of the one or more submodels updates the one or more submodels based on the loss function difference.

In a possible implementation, the method further includes: The first network data analytics network element receives a second request message from a second network data analytics network element, where the second request message is for requesting to train the target model, and the second request message includes an identifier of the target model.

In a possible implementation, the second request message includes one or more of the following: third slice identification information, third service identification information, third area information, third time information, third terminal identification information, third network device identification information, third model training algorithm information, third model feedback validity time information, or third model convergence condition information.

In a possible implementation, the method further includes: The first network data analytics network element sends a second response message to the second network data analytics network element, where the second response message includes the target model or address information corresponding to the target model.

In a possible implementation, the second response message further includes one or more of the following: the third slice identification information, the third service identification information, the third area information, the third time information, the third terminal identification information, the third network device identification information, or model training complete indication information.

In a possible implementation, the method further includes: The first network data analytics network element receives an inference result from a first network element, where the inference result is obtained by the first network element based on a submodel in the first network element. The first network data analytics network element outputs a target inference result based on the target model and the inference result of the first network element. The first network data analytics network element sends the target inference result to a second network element, where the second network element is the same as or different from the first network element.

According to a second aspect, an embodiment of this disclosure provides a data processing method. The method includes: A second network data analytics network element separately obtains an inference result from one or more network elements, where the inference result is obtained through calculation by the one or more network elements by using a submodel, and the inference result reflects a value of impact of the submodel on a target model of the second network data analytics network element. The second network data analytics network element obtains a target inference result through calculation that is based on the target model and the inference result of the one or more network elements. The second network data analytics network element sends the target inference result to the one or more network elements.

In a possible implementation, there are a plurality of network elements, including a first network element and a second network element. A second network data analytics network element separately obtains an inference result from one or more network elements by performing steps including: The second network data analytics network element receives first information from the first network element, where the first information includes an inference result of the first network element and identification information of a first submodel, and the inference result of the first network element is obtained by the first network element through calculation that is based on the first submodel. The second network data analytics network element determines identification information of a second submodel related to the identification information of the first submodel, where the second submodel is installed in the second network element. The second network data analytics network element sends, to the second network element, a request message for requesting a recommendation result of the second network element, where the request message includes the identification information of the second submodel. The second network data analytics network element receives a response message from the second network element, where the response message includes the recommendation result of the second network element, and the recommendation result of the second network element is obtained by the second network element through calculation that is based on the second submodel.

In a possible implementation, the first information and/or the request message and/or the response message further include association information, where the association information is for associating inference results of same sample objects of the first network element and the second network element.

In a possible implementation, the association information includes one or more of the following: an interface identifier, an N2 tunnel identifier, an N3 tunnel identifier, association time information, a quality of service flow identifier QFI, an internet protocol IP 5-tuple, an international mobile subscriber identity IMSI, a generic public subscription identifier GPSI, or a subscriber permanent identifier SUPI. Alternatively, the association information includes an association indication and one or more of the following information: an interface identifier, an N2 tunnel identifier, an N3 tunnel identifier, association time information, a quality of service flow identifier QFI, an internet protocol IP 5-tuple, an international mobile subscriber identity IMSI, a generic public subscription identifier GPSI, or a subscriber permanent identifier SUPI.

In a possible implementation, the method further includes: The second network data analytics network element sends a second request message to a first network data analytics network element, where the second request message is for requesting to train the target model, and the second request message includes an identifier of the target model. The second network data analytics network element receives a second response message from the first network data analytics network element, where the second response message includes the target model or address information corresponding to the target model.

In a possible implementation, the second request message includes one or more of the following: third slice identification information, third service identification information, third area information, third time information, third terminal identification information, third network device identification information, third model training algorithm information, third model feedback validity time information, or third model convergence condition information.

In a possible implementation, the second response message further includes one or more of the following: the third slice identification information, the third service identification information, the third area information, the third time information, the third terminal identification information, the third network device identification information, or model training complete indication information.

According to a third aspect, an embodiment of this disclosure provides a data processing apparatus. The data processing apparatus may be a first network data analytics network element, or may be a chip or a chip system in the first network data analytics network element. The data processing apparatus may include a processing unit and a communication unit. When the data processing apparatus is the first network data analytics network element, the processing unit may be a processor, and the communication unit may be a communication interface or an interface circuit. The data processing apparatus may further include a storage unit, and the storage unit may be a memory. The storage unit is configured to store instructions, and the processing unit executes the instructions stored in the storage unit, so that the first network data analytics network element implements the data processing method according to any one of the first aspect or the possible implementations of the first aspect. When the data processing apparatus is the chip or the chip system in the first network data analytics network element, the processing unit may be a processor, and the communication unit may be a communication interface. For example, the communication interface may be an input/output interface, a pin, or a circuit. The processing unit executes instructions stored in a storage unit, so that the first network data analytics network element implements the data processing method according to any one of the first aspect or the possible implementations of the first aspect. The storage unit may be a storage unit (for example, a register or a cache) in the chip, or may be a storage unit (for example, a read-only memory or a random access memory) that is in the first network data analytics network element and that is outside the chip.

For example, the processing unit is configured to determine identification information of one or more submodels related to a target model. The communication unit is configured to send a first request message to a network element corresponding to the identification information of the submodel, where the first request message includes the identification information of the submodel. The communication unit is further configured to receive a first response message from the network element, where the first response message includes a first output result obtained through calculation by the network element by using the submodel, and the first output result reflects a value of impact of the submodel on the target model. The processing unit is further configured to obtain the target model through training that is based on the first output result of one or more network elements corresponding to the identification information of the one or more submodels.

In a possible implementation, the processing unit is specifically configured to determine, based on a local configuration, the identification information of the one or more submodels related to the target model; or the processing unit is specifically configured to: determine a network element that is related to the target model and that has a confidentiality requirement; and obtain the identification information of the one or more submodels from the network element having the confidentiality requirement.

In a possible implementation, the first request message further includes one or more of the following: first slice identification information, first service identification information, first area information, first time information, first terminal identification information, first network device identification information, first model training algorithm information, first model feedback validity time information, or first model convergence condition information. The first slice identification information indicates to provide an output result corresponding to the first slice identification information. The first service identification information indicates to provide an output result corresponding to the first service identification information. The first area information indicates to provide an output result corresponding to the first area information. The first time information indicates to provide an output result corresponding to the first time information. The first terminal identification information indicates to provide an output result corresponding to the first terminal identification information. The first network device identification information indicates to provide an output result corresponding to the first network device identification information. The first model training algorithm information is for recommending a model training algorithm to be used for the submodel. The first model feedback validity time information indicates a validity time period for feeding back an output result. The first model convergence condition information indicates a model training convergence condition.

In a possible implementation, the first response message further includes one or more of the following: the identification information of the submodel, association information, a quantity N of iterations, second model training algorithm information, second slice identification information, second service identification information, or second area information. The association information is for associating output results of a same sample object. The quantity N of iterations indicates that an output result of the network element corresponding to the identification information of the submodel is a result generated in an $N^{th}$ iteration process. The second model algorithm information indicates an algorithm used by the network element corresponding to the identification information of the submodel. The second slice identification information indicates that the output result of the network element corresponding to the identification information of the submodel includes an output result for the second slice identification information. The second service identification information indicates that the output result of the network element corresponding to the identification information of the submodel includes an output result for the second service identification information. The second area information indicates that the output result of the network element corresponding to the identification information of the submodel includes an output result for the second area information.

In a possible implementation, the association information includes one or more of the following: an interface identifier, an N2 tunnel identifier, an N3 tunnel identifier, association time information, a quality of service flow identifier QFI, an internet protocol IP 5-tuple, an international mobile subscriber identity IMSI, a generic public subscription identifier GPSI, or a subscriber permanent identifier SUPI. Alternatively, the association information includes an association indication and one or more of the following information: an interface identifier, an N2 tunnel identifier, an N3 tunnel identifier, association time information, a quality of service flow identifier QFI, an internet protocol IP 5-tuple, an international mobile subscriber identity IMSI, a generic public subscription identifier GPSI, or a subscriber permanent identifier SUPI.

In a possible implementation, the processing unit is specifically configured to: input the first output result of the one or more network elements to a preset model; and adjust the preset model based on a loss function difference between sample label data and an output result of the preset model until the loss function difference between the sample label data and the output result of the preset model meets a condition, to obtain the target model.

In a possible implementation, the communication unit is further configured to send the loss function difference to the network element corresponding to the identification information of the one or more submodels, where the network element corresponding to the identification information of the one or more submodels updates the one or more submodels based on the loss function difference.

In a possible implementation, the communication unit is further configured to receive a second request message from a second network data analytics network element, where the second request message is for requesting to train the target model, and the second request message includes an identifier of the target model.

In a possible implementation, the second request message includes one or more of the following: third slice identification information, third service identification information, third area information, third time information, third terminal identification information, third network device identification information, third model training algorithm information, third model feedback validity time information, or third model convergence condition information.

In a possible implementation, the communication unit is further configured to send a second response message to the second network data analytics network element, where the second response message includes the target model or address information corresponding to the target model.

In a possible implementation, the second response message further includes one or more of the following: the third slice identification information, the third service identification information, the third area information, the third time information, the third terminal identification information, the third network device identification information, or model training complete indication information.

In a possible implementation, the communication unit is further configured to receive an inference result from a first network element, where the inference result is obtained by the first network element based on a submodel in the first network element; the processing unit is further configured to output a target inference result based on the target model and the inference result of the first network element; and the communication unit is further configured to send the target inference result to a second network element, where the second network element is the same as or different from the first network element.

According to a fourth aspect, an embodiment of this disclosure provides a data processing apparatus. The data processing apparatus may be a second network data analytics network element, or may be a chip or a chip system in the second network data analytics network element. The data processing apparatus may include a processing unit and a communication unit. When the data processing apparatus is the second network data analytics network element, the processing unit may be a processor, and the communication unit may be a communication interface or an interface circuit. The data processing apparatus may further include a storage unit, and the storage unit may be a memory. The storage unit is configured to store instructions, and the processing unit executes the instructions stored in the storage unit, so that the second network data analytics network element implements the data processing method according to any one of the second aspect or the possible implementations of the second aspect. When the data processing apparatus is the chip or the chip system in the second network data analytics network element, the processing unit may be a processor, and the communication unit may be a communication interface. For example, the communication interface may be an input/output interface, a pin, or a circuit. The processing unit executes instructions stored in a storage unit, so that the second network data analytics network element implements the data processing method according to any one of the second aspect or the possible implementations of the second aspect. The storage unit may be a storage unit (for example, a register or a cache) in the chip, or may be a storage unit (for example, a read-only memory or a random access memory) that is in the second network data analytics network element and that is outside the chip.

For example, the processing unit is configured to separately obtain an inference result from one or more network elements, where the inference result is obtained through calculation by the one or more network elements by using a submodel, and the inference result reflects a value of impact of the submodel on a target model of the second network data analytics network element. The processing unit is further configured to obtain a target inference result through calculation that is based on the target model and the inference result of the one or more network elements. The communication unit is configured to send the target inference result to the one or more network elements.

In a possible implementation, there are a plurality of network elements, including a first network element and a second network element. The communication unit is further configured to receive first information from the first network element, where the first information includes an inference result of the first network element and identification information of a first submodel, and the inference result of the first network element is obtained by the first network element through calculation that is based on the first submodel. The processing unit is further configured to determine identification information of a second submodel related to the identification information of the first submodel, where the second submodel is installed in the second network element. The communication unit is further configured to send, to the second network element, a request message for requesting a recommendation result of the second network element, where the request message includes the identification information of the second submodel. The communication unit is further configured to receive a response message from the second network element, where the response message includes the recommendation result of the second network element, and the recommendation result of the second network element is obtained by the second network element through calculation that is based on the second submodel.

In a possible implementation, the first information and/or the request message and/or the response message further include association information, where the association information is for associating inference results of same sample objects of the first network element and the second network element.

In a possible implementation, the association information includes one or more of the following: an interface identifier, an N2 tunnel identifier, an N3 tunnel identifier, association time information, a quality of service flow identifier QFI, an internet protocol IP 5-tuple, an international mobile subscriber identity IMSI, a generic public subscription identifier GPSI, or a subscriber permanent identifier SUPI. Alternatively, the association information includes an association indication and one or more of the following information: an interface identifier, an N2 tunnel identifier, an N3 tunnel identifier, association time information, a quality of service flow identifier QFI, an internet protocol IP 5-tuple, an international mobile subscriber identity IMSI, a generic public subscription identifier GPSI, or a subscriber permanent identifier SUPI.

In a possible implementation, the communication unit is further configured to send a second request message to a first network data analytics network element, where the second request message is for requesting to train the target model, and the second request message includes an identifier of the target model. The communication unit is further configured to receive a second response message from the first network data analytics network element, where the second response message includes the target model or address information corresponding to the target model.

In a possible implementation, the second request message includes one or more of the following: third slice identification information, third service identification information, third area information, third time information, third terminal identification information, third network device identification information, third model training algorithm information, third model feedback validity time information, or third model convergence condition information.

In a possible implementation, the second response message further includes one or more of the following: the third slice identification information, the third service identification information, the third area information, the third time information, the third terminal identification information, the third network device identification information, or model training complete indication information.

According to a fifth aspect, an embodiment of this disclosure provides a computer-readable storage medium. The computer-readable storage medium stores a computer program or instructions. When the computer program or the instructions are run on a computer, the computer is enabled to perform the method according to any one of the implementations of the first aspect and the second aspect.

According to a sixth aspect, an embodiment of this disclosure provides a computer program product including instructions. When the instructions are run on a computer, the computer is enabled to perform the method according to any one of the implementations of the first aspect and the second aspect.

According to a seventh aspect, an embodiment of this disclosure provides a communication system. The communication system includes any one or more of the following: the data processing apparatus according to the third aspect and the possible implementations of the third aspect, and the data processing apparatus according to the fourth aspect and the possible implementations of the fourth aspect.

According to an eighth aspect, an embodiment of this disclosure provides a communication apparatus. The communication apparatus includes a processor and a storage medium. The storage medium stores instructions. When the instructions are run by the processor, the data processing method according to any one of the implementations of the first aspect and the second aspect is implemented.

According to a ninth aspect, this disclosure provides a chip or a chip system. The chip or the chip system includes at least one processor and a communication interface. The communication interface and the at least one processor are interconnected through a line. The at least one processor is configured to run a computer program or instructions, to perform the data processing method according to any one of the implementations of the first aspect and the second aspect.

The communication interface in the chip may be an input/output interface, a pin, a circuit, or the like.

In a possible implementation, the chip or the chip system described in this disclosure further includes at least one memory, and the at least one memory stores instructions. The memory may be a storage unit, for example, a register or a cache, inside the chip, or may be a storage unit (for example, a read-only memory or a random access memory) of the chip.

It should be understood that the technical solutions in the second aspect to the ninth aspect of embodiments of this disclosure correspond to the technical solutions in the first aspect of embodiments of this disclosure, and beneficial effects achieved by the aspects and the corresponding feasible implementations are similar. Details are not described again.

DESCRIPTION OF EMBODIMENTS

Figure 1:
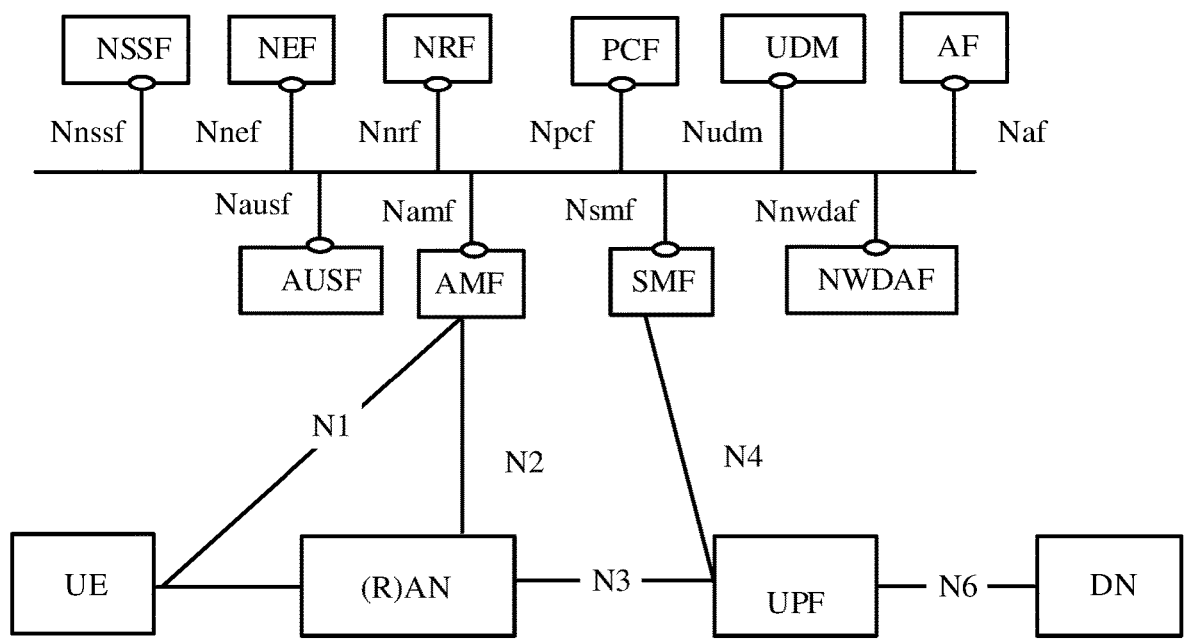
FIG. 1 is a schematic diagram of a network architecture according to an embodiment of this disclosure.

To clearly describe technical solutions in embodiments of this disclosure, terms such as "first" and "second" are used in embodiments of this disclosure to distinguish between same items or similar items that provide basically same functions. For example, a first network element and a second network element are merely intended to distinguish between different network elements, and are not intended to limit a sequence thereof. A person skilled in the art may understand that the terms such as "first" and "second" do not limit a quantity or an execution sequence, and the terms such as "first" and "second" do not indicate a definite difference.

It should be noted that in this disclosure, the term such as "an example" or "for example" is used to represent giving an example, an illustration, or descriptions. Any embodiment or design scheme described as an "example" or "for example" in this disclosure should not be explained as being more preferable or having more advantages than another embodiment or design scheme. Exactly, use of the term such as "example" or "for example" is intended to present a related concept in a specific manner.

In this disclosure, "at least one" means one or more, and "a plurality of" means two or more. "And/or" describes an association relationship between associated objects, and indicates that three relationships may exist. For example, A and/or B may indicate the following cases: Only A exists, both A and B exist, and only B exists, where A and B may be singular or plural. The character "/" usually indicates an "or" relationship between the associated objects. "At least one of the following items (pieces)" or a similar expression thereof indicates any combination of these items, including a single item (piece) or any combination of a plurality of items (pieces). For example, at least one item (piece) of a, b, or c may indicate: a, b, c, a and b, a and c, b and c, or a, b, and c, where a, b, and c may be singular or plural.

Usually, an NWDAF network element needs to collect sample data of each domain in a communication network, for example, collect access network data from a radio access network (RAN), collect core network data from a core network (CN), collect terminal data from user equipment (UE), collect management domain data from a management plane function (OAM) network element, and collect third-party data from an application function (AF) network element. Then, the NWDAF network element performs centralized analysis, training, and inference based on the collected sample data.

However, due to privacy protection of RAN domain data, the NWDAF network element may fail to directly obtain required training data such as a quality of service flow bit rate (QFBR) and a quality of service flow packet delay (QFPD) from the RAN. Consequently, the NWDAF network element cannot centrally train a model for a service MOS. For example, an operator is not willing to expose network data of the operator to a third party, or a third party is not willing to expose data to an operator; or a RAN domain is not willing to expose access network-related data to another domain; or a terminal device does not expose privacy data of the terminal device to a communication network due to a personal privacy concern. Due to a data isolation problem, conventional data collection and centralized data analysis and training are difficult to be implemented.

Based on this, in embodiments of this disclosure, when a plurality of network elements do not exchange original data, a network data analytics network element may train a target model by using an output result that is obtained through calculation by the plurality of network elements and that reflects a value of impact of a local model in a network element on the target model, to avoid data leakage and obtain a comprehensive and accurate target model, so that functions such as accurate data collection, data analysis, and data training can be provided.

A method in embodiments of this disclosure may be applied to long term evolution (LTE), a 5th generation (5G) mobile communication system, or a future mobile communication system.

For example, FIG. 1 is a schematic diagram of a network architecture according to an embodiment of this disclosure. The architecture supports access to a core network (CN) by using a wireless technology (for example, LTE or a 5G radio access network (RAN)) that is defined by the 3rd generation partnership project (3GPP) standards group, and also supports access to the core network by using a non-3GPP access technology through a non-3GPP interworking function (N3IWF) or a next generation access gateway (ngPDG).

The network architecture includes a terminal device, an access network (AN), a core network, and a data network (DN). An access network apparatus is mainly configured to implement functions such as a radio physical layer function, resource scheduling, radio resource management, radio access control, and mobility management. A core network device may include a management device and a gateway device. The management device is mainly configured to perform device registration, security authentication, mobility management, location management, and the like for the terminal device. The gateway device is mainly configured to establish a channel with the terminal device, and forward a data packet between the terminal device and an external data network on the channel. The data network may include a network device (for example, a device such as a server or a router), and the data network is mainly configured to provide a plurality of data services for the terminal device. For example, a terminal device, an access network, a core network, and a data network in 5G are used as an example for description.

The terminal device includes but is not limited to user equipment (UE), a subscriber unit, a subscriber station, a mobile station, a remote station, a remote terminal device, a mobile terminal device, a user terminal device, a wireless communication device, a user agent, a user apparatus, a cellular phone, a cordless phone, a session initiation protocol (SIP) phone, a wireless local loop (WLL) station, a personal digital assistant (PDA), a handheld device having a wireless communication function, a computing device, a processing device connected to a wireless modem, a vehicle-mounted device, a wearable device, an internet of things terminal device, a household appliance, a virtual reality device, a terminal device in a future 5G network, a terminal device in a future evolved public land mobile network (PLMN), or the like.

The access network in 5G may be a radio access network ((R)AN). A (R)AN device in a 5G system may include a plurality of 5G-(R)AN nodes. The 5G-(R)AN node may include an access point (AP) in a 3GPP access network or a non-3GPP access network such as a Wi-Fi network, a next-generation base station (which may be collectively referred to as a next-generation radio access network node (NG-RAN node), where the next-generation base station includes a new radio NodeB (NR NodeB, gNB), a next-generation evolved NodeB (NG-eNB), a gNB in a form in which a central unit (CU) and a distributed unit (DU) are split, and the like), a transmission reception point (TRP), a transmission point (TP), or another node. An access network device may communicate with the terminal device. For example, the access network device may provide communication coverage for a specific geographical area, and may communicate with a terminal device located in the coverage (cell), where there may be one or more terminal devices.

The 5G core (5G core/new generation core, 5GC/NGC) network includes a plurality of functional units such as an access and mobility management function (AMF) network element, a session management function (SMF) network element, a user plane function (UPF) network element, an authentication server function (AUSF) network element, a policy control function (PCF) network element, an application function (AF) network element, a unified data management (UDM) network element, a network slice selection function (NSSF) network element, a network function (NEF) network element, and a management plane function (OAM) network element.

The AMF network element is mainly responsible for services such as mobility management and access management. The SMF network element is mainly responsible for session management, a dynamic host configuration protocol function, user plane function selection and control, and the like. The UPF network element is mainly responsible for functions related to an external connection to a data network (DN), user plane data packet routing and forwarding, packet filtering, quality of service (QoS) control, and the like. The DN mainly provides a service for user equipment, for example, provides a mobile operator service, an Internet service, or a third-party service. The AUSF network element is mainly responsible for a terminal device authentication function and the like. The PCF network element is mainly responsible for providing a unified policy framework for network behavior management, providing a policy rule for a control plane function, obtaining registration information related to a policy decision, and the like. It should be noted that these functional units may independently operate, or may be combined to implement some control functions, for example, access control and mobility management functions such as access authentication, security encryption, and location registration of the terminal device, and session management functions such as establishment, release, and change of a user plane transmission path. The AF network element serves as a server side that provides a type of service for a user, and therefore may also be referred to as an application server or a service server. The UDM network element is for unified user data management, and is mainly configured to store subscription data of user equipment. The OAM network element provides network management functions including fault monitoring, fault reporting, fault locating, and fault rectification.

An NWDAF network element has at least one of the following functions: a data collection function, a data training function, and a data inference function. The data collection function means that the NWDAF may collect sample data from a network element, a third-party service server, a terminal device, a network management system, or the like, and the sample data may be used as input data of the data training or data inference function. The data training function means that the NWDAF performs offline data analysis and training on a large amount of input data, to obtain a corresponding data model or data rule. The data inference function means that the NWDAF performs online inference based on the input data and provides a data analysis result obtained through inference for the network element, the third-party service server, the terminal device, or the network management system. The analysis result can help a network select a quality of service parameter of a service, perform traffic routing, select a background traffic transmission policy, or the like.

The NWDAF network element may be an independently deployed network element, or may be co-deployed with another network element (for example, an AMF network element, an SMF network element, or a PCF network element). This may alternatively be understood as: The function of the NWDAF network element is added to the another network element. This is not specifically limited in embodiments of this disclosure.

The functional units in the 5G system may communicate with each other through a next generation (NG) interface. For example, the terminal device may perform transmission of a control plane message with the AMF network element through an NG interface 1 (which is referred to as N1 for short). The RAN device may establish a user plane communication connection to the UPF through an NG interface 3 (which is referred to as N3 for short), to establish a channel. The AN/RAN device may establish a control plane signaling connection to the AMF network element through an NG interface 2 (which is referred to as N2 for short). The UPF may exchange information with the SMF network element through an NG interface 4 (which is referred to as N4 for short). The UPF may exchange user plane data with the data network DN through an NG interface 6 (which is referred to as N6 for short). The AMF network element may exchange information with the SMF network element through an NG interface 11 (which is referred to as N11 for short). The SMF network element may exchange information with the PCF network element through an NG interface 7 (which is referred to as N7 for short). The AMF network element may exchange information with the AUSF through an NG interface 12 (which is referred to as N12 for short).

Figure 2:
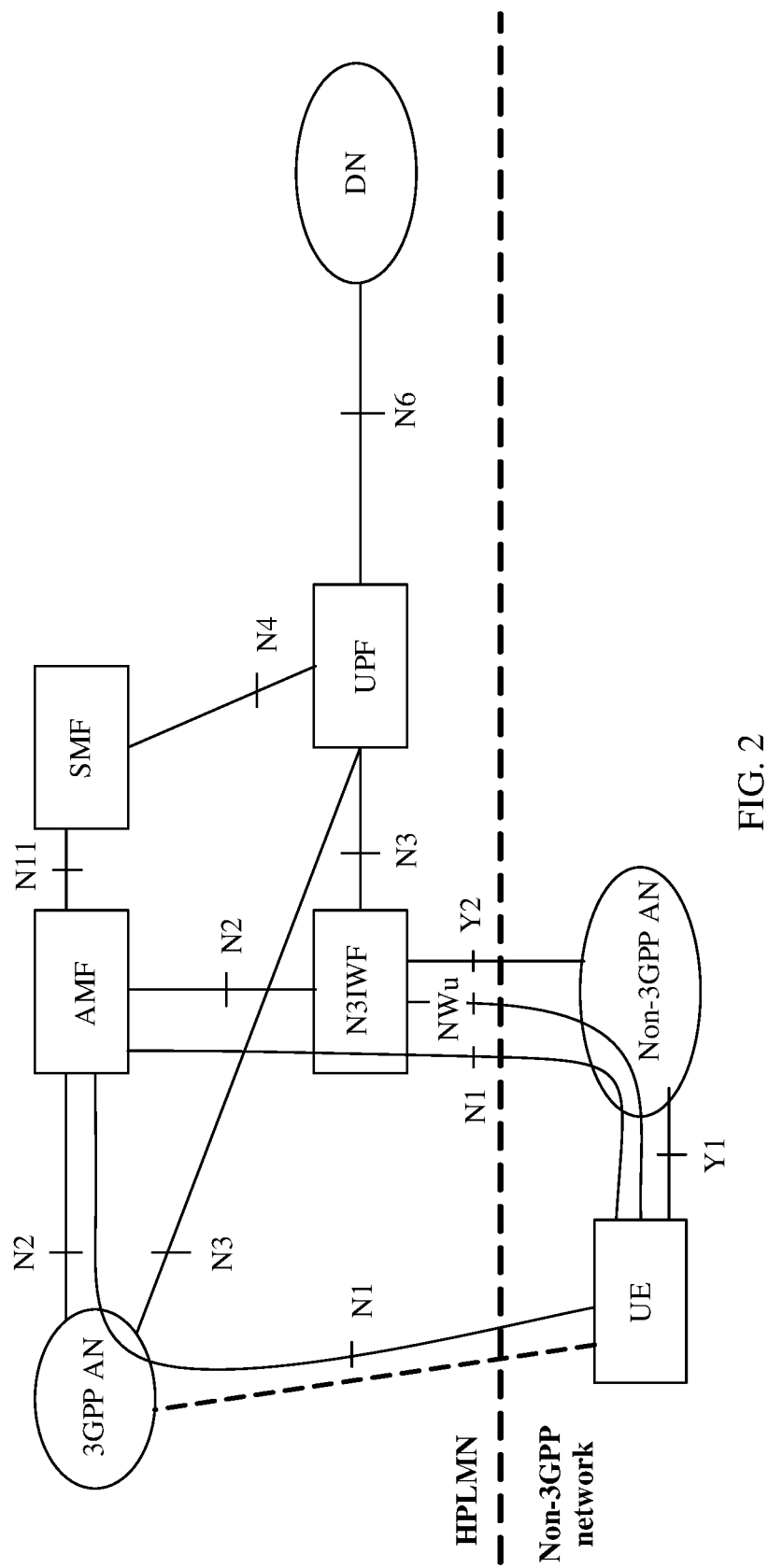
FIG. 2 is another schematic diagram of a network architecture according to an embodiment of this disclosure.

For example, FIG. 2 is a schematic diagram of a specific network architecture when a core network supports untrusted non-3GPP access. A network architecture in a home public land mobile network (HPLMN) is similar to the implementation in FIG. 1, and details are not described herein again. The untrusted non-3GPP access may be untrusted wireless local area network (WLAN) access. In this architecture, a terminal device may further exchange information with an AMF through the untrusted non-3GPP access, a non-3GPP interworking function (N3IWF)/a non-3GPP access gateway, and an N3IWF network element may exchange information with a UPF through N3.

In addition, the core network may further support trusted non-3GPP access and/or fixed network access. A trusted non-3GPP network includes a trusted WLAN network, and a fixed network includes fixed home network access and the like. A network side architecture is similar to an untrusted non-3GPP network architecture, where the N3IWF and an untrusted access network are replaced with a trusted non-3GPP access network; or the N3IWF is replaced with a trusted non-3GPP access gateway, and an untrusted access network is replaced with a trusted access network. An access network device between the terminal device and the trusted non-3GPP access gateway may include a WLAN AP, a fixed access network (FAN) device, a switch, a router, and the like.

Regardless of the trusted non-3GPP access or the untrusted non-3GPP access, a point-to-point interface protocol shown in FIG. 1 may be used on a core network side, or a service-oriented interface architecture consistent with a 3GPP access core network architecture may be used. This is not specifically limited in embodiments of this disclosure.

In a possible implementation, a 3GPP access technology and a non-3GPP access technology may include a plurality of access standards or frequency bands, and both the plurality of access standards and frequency bands may be used. For example, 3GPP access includes access to a 5GC by using both two access technologies: LTE in 4G and NG-RAN in 5G. Non-3GPP Wi-Fi access also includes access on both two frequency bands, for example, access to the 5GC on both a 5 GHz Wi-Fi frequency band and a 2.4 GHz Wi-Fi frequency band. In a possible implementation, UE may access a 5GC architecture in at least two access manners (including the four access manners) of the foregoing four access manners.

The method in embodiments of this disclosure may be further applied to an architecture in which both 5G cellular (NG-RAN) access and 4G cellular (LTE) access are performed and the like in addition to the foregoing 5G 3GPP access architecture, a non-3GPP access architecture, or an architecture in which both 3GPP access and non-3GPP access are performed. A network architecture is not specifically limited in embodiments of this disclosure.

Figure 3:
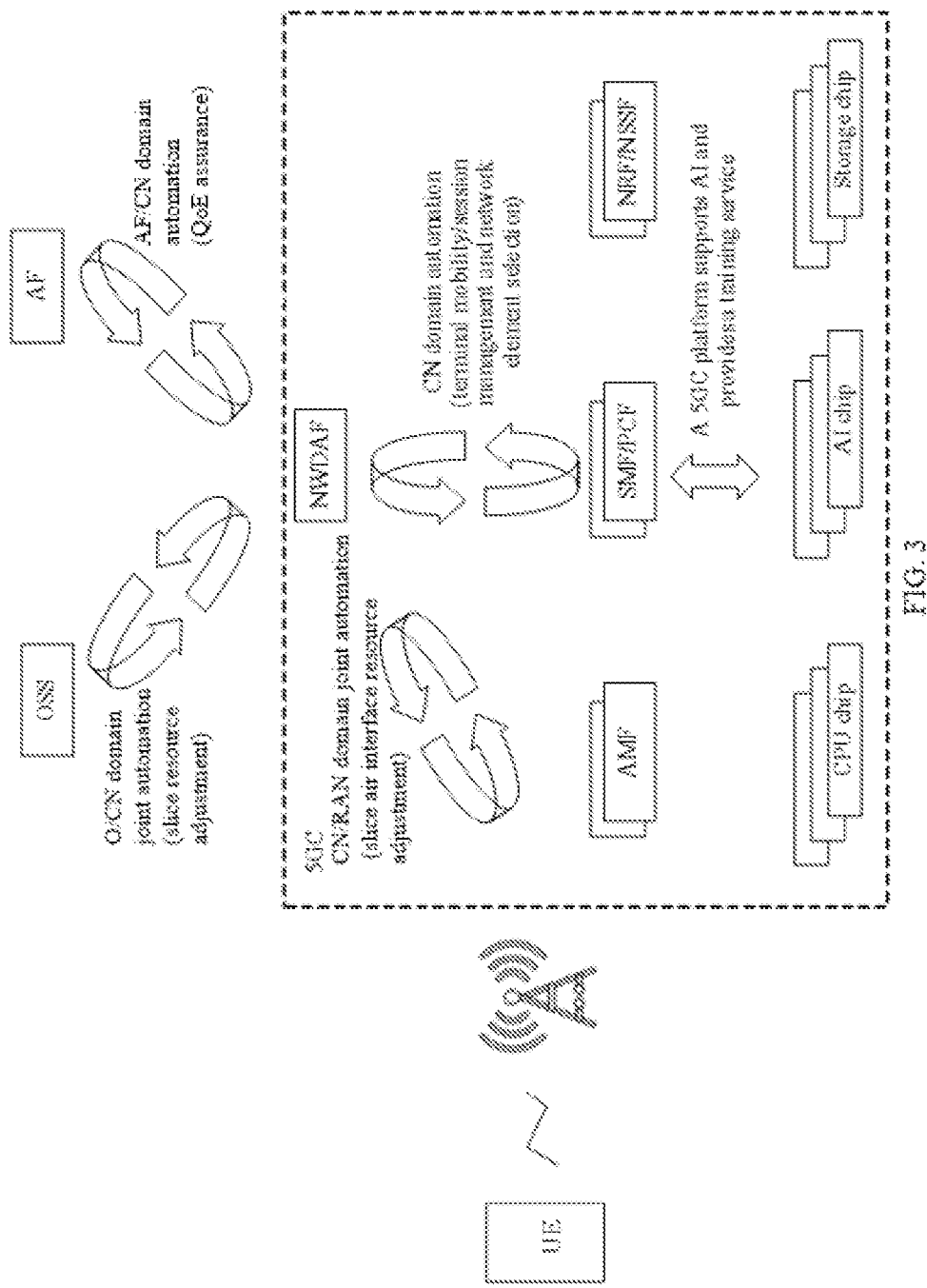
FIG. 3 is a schematic diagram of an architecture of a data processing method according to an embodiment of this disclosure.

For example, FIG. 3 is a schematic diagram of an application scenario of a data processing method according to an embodiment of this disclosure.

As shown in FIG. 3, in embodiments of this disclosure, each domain (for example, a RAN domain, a CN domain, an OAM domain, an AF domain, or a UE domain) may have a local training function in the domain, and local sample data may be locally collected, analyzed, and trained, to obtain a local output result.

In a 5G core network (5GC), an artificial intelligence (AI) training platform, an inference platform, an AMF network element, an SMF network element, a PCF network element, an NRF network element, an NSSF network element, and the like may be deployed.

The AI training platform has a data training function; and can use original sample data from a network element, a third-party service server, a terminal device, or a network management system, or an output result of a local model as training data, and perform analysis and training operations based on the training data, to generate a corresponding trained model. The trained model may be subsequently distributed to the inference platform for inference.

In a possible implementation, the AI training platform may alternatively be a network element independently deployed for an operator, a training platform deployed by a third party, or the like.

The inference platform has a data inference function; and can communicate with an operations support system (OSS), the CN domain, the RAN domain, and the AI training platform, and perform analysis and inference based on the trained model as needed.

In embodiments of this disclosure, an example in which the AI training platform and the inference platform are independently deployed and the inference platform is specifically an NWDAF is used for description. In another possible implementation, the AI training platform and the inference platform may alternatively be co-deployed. For example, an NWDAF may serve as both the AI training platform and the inference platform. This is not specifically limited in embodiments of this disclosure.

The following describes some terms in embodiments of this disclosure.

A submodel described in embodiments of this disclosure may be a local model of a network element. The submodel may be obtained by the network element through training by using original data. An output result of the submodel may be considered as data that is obtained through processing based on the submodel and that is different from the original data. The output result of the submodel may also be referred to as an intermediate result, an intermediate training result, or the like (for ease of description, the output result of the submodel is referred to as an intermediate result for short below). When a target model is being trained by using the intermediate result, the output result of the submodel may reflect a value of impact of the submodel on the target model, so that privacy is ensured and an accurate target model may be obtained. The submodel may be a deep learning model, or may be any artificial intelligence model. This is not specifically limited in embodiments of this disclosure.

A target model described in embodiments of this disclosure may be obtained through training by using a plurality of intermediate results, or may be obtained through comprehensive training by using a plurality of intermediate results, original sample data, and the like. The target model may be used for analysis and inference. The target model may be a deep learning model, or may be any artificial intelligence model. This is not specifically limited in embodiments of this disclosure.

A first network data analytics network element described in embodiments of this disclosure may be an AI training platform, or may be a network element that can implement a data training function, for example, an NWDAF network element, an AMF network element, an SMF network element, or a PCF network element. The first network data analytics network element may be used to train a target model.

A second network data analytics network element described in embodiments of this disclosure may be an NWDAF network element (or may be an NWDAF inference platform or the like), or may be a network element that can implement a data inference function, for example, an AMF network element, an SMF network element, or a PCF network element.

In a possible implementation, the AI training platform and the NWDAF network element may be co-deployed. The first network data analytics network element may be the same as the second network data analytics network element, and the first network data analytics network element and the second network data analytics network element may not need to perform communication such as requesting and responding with each other.

In a possible implementation, the AI training platform and the NWDAF network element are independent of each other. The first network data analytics network element may be used to train a target model, and the second network data analytics network element may obtain the target model from the first network data analytics network element, perform inference and analysis based on the target model, and the like.

Figure 4:
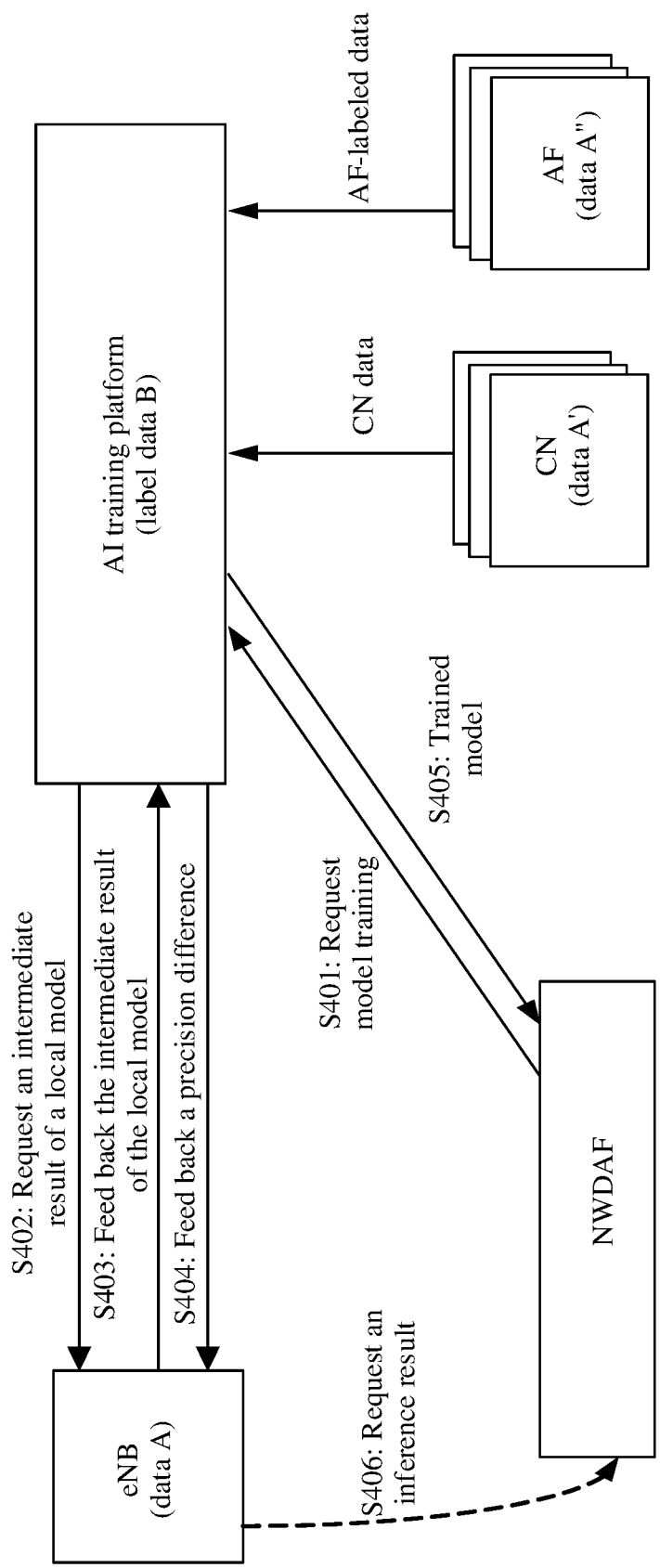
FIG. 4 is a schematic diagram of a concept of a data processing method according to an embodiment of this disclosure.

For example, FIG. 4 is a schematic diagram of an application scenario in which an AI training platform and an NWDAF network element are independent of each other. As shown in FIG. 4, the following steps may be included.

S401: The NWDAF network element sends, to the AI training platform, a request message for requesting model training, where the request message carries a model identifier ID1, and ID1 may identify a specific model (for example, a model identifier corresponding to a voice service MOS) requested by the NWDAF network element.

S402: If the AI training platform determines that the ID1 model is affected by a RAN parameter, and the RAN parameter cannot be reported due to data isolation (or it may be considered that there is a confidentiality requirement or a privacy requirement), the AI training platform sends, to a RAN, a request message for requesting the RAN to provide an intermediate result corresponding to a local model. For example, the local model (which is also referred to as a submodel) is $f(x)=\theta_A x^A$, and the intermediate result is $\theta_A x_i^A$, where i represents an $i^{th}$ sample object, and $x_i^A$ is a sample data vector of a RAN domain corresponding to the $i^{th}$ sample object, for example, a reference signal received power (RSRP) value, a reference signal received quality (RSRQ) value, and a signal to interference plus noise ratio (SINR) value of UEi in the RAN domain. In a possible implementation, the request message for requesting the RAN to provide the intermediate result corresponding to the local model may indicate an associated model identifier ID2, where ID2 is generated by the AI training platform based on ID1, and indicates, to the RAN side, a specific local model that is associated in the RAN. The intermediate result may be an intermediate value obtained through calculation by the RAN based on the local model, and represents an intermediate contribution value of the RAN side to a final result of the ID1 model.

For example, a function model of the foregoing voice service MOS is:

$$h(x)=w1x1+w2x2+w3x3+w4x4+w5x5+w6x6+\ldots+wDxD.$$

Each of w1 to wD may be a weight value, each of x1 to xD may be a data value of a D-dimensional sample vector of a sample object, D is a natural number, and one or more of w1x1 to wDxD may be an intermediate value, or a part of w1x1 to wDxD may be an intermediate value. For example, w4x4+w5x5+w6x6 may be an intermediate value, and represents an intermediate contribution value of the RAN to the service MOS. It should be noted that, in a common centralized model training manner, the RAN reports sample data values x4, x5, and x6 of each object. In this embodiment of this disclosure, the RAN may report only a weighted value of w4x4+w5x5+w6x6, and does not need to expose each piece of sample data, so that the privacy requirement can be met.

S403: The RAN feeds back the intermediate result (for example, $\theta_A x_i^A$) to the AI training platform.

S404: The AI training platform obtains a precision difference di through calculation; and determines, based on di, whether the precision difference meets a preset requirement. This may alternatively be understood as determining whether a model is converged.

For example, the AI training platform obtains an output value of a comprehensive model h(xi) through calculation based on the intermediate result (for example, $\theta_A x_i^A$) fed back by the RAN, a local model (for example, a model trained by the AI training platform based on real sample data obtained from a CN) that corresponds to ID1 and that is trained by the AI training platform, and the like. The AI training platform obtains the precision difference through calculation based on the output value of h(xi) and a label value (yi, which may be a label value that is set by the AI training platform or that is externally obtained, and is used to determine whether the model is converged or used to calculate di) (for example, di=h(xi)−yi, where h(xi) is a calculated value based on $\theta_A x_1^A$ and the h(x) model, and yi is the label value stored by the AI training platform).

If the AI training platform determines, based on the di value, that the model is not converged, in a possible implementation, the AI training platform iteratively adjusts, based on the di value, a model parameter value corresponding to local data of the AI training platform. For example, in the h(x) model example, weight values w1, w2, w3, and wD are updated. In addition, the AI training platform feeds back the precision difference di to the RAN, so that the RAN iterates the local model based on di. For example, if the local model is $f(x)=\theta_A x^A$, the RAN updates $\theta_A$ based on di.

S3 and S4 are repeated until di meets the precision requirement, and it may be considered that the model is converged.

S405: The AI training platform feeds back a model analysis result to the NWDAF network element, to install the model on the inference platform NWDAF network element. In the foregoing example, the AI training platform feeds back a function relationship of h(x)=w1x1+w2x2+w3x3+f(x)+ . . . +wDxD to the NWDAF network element, where f(x) may be considered as the intermediate result (which is also referred to as an output result of a local model or the like).

S406: For a to-be-inferred object j in a live network, the RAN reports, online, a calculated value of an intermediate result $f(x_j)=\theta_A x_j^A$ related to the to-be-inferred object j to the NWDAF network element, so that the NWDAF network element obtains a real-time analysis result (for example, a real-time analysis result of a voice service MOS of UEj) through calculation based on a model obtained from the AI training platform in advance. For example, a value corresponding to $h(x_j)=w1x_j1+w2x_j2+w3x_j3+f(x_j)+ \ldots +wDx_jD$ is calculated online based on the h(x) model.

By using specific embodiments, the following describes in detail the technical solutions of this disclosure and how to resolve the foregoing technical problem by using the technical solutions of this disclosure. The following several specific embodiments may be implemented independently or combined with each other, and same or similar concepts or processes may not be repeatedly described in some embodiments.

Figure 5:
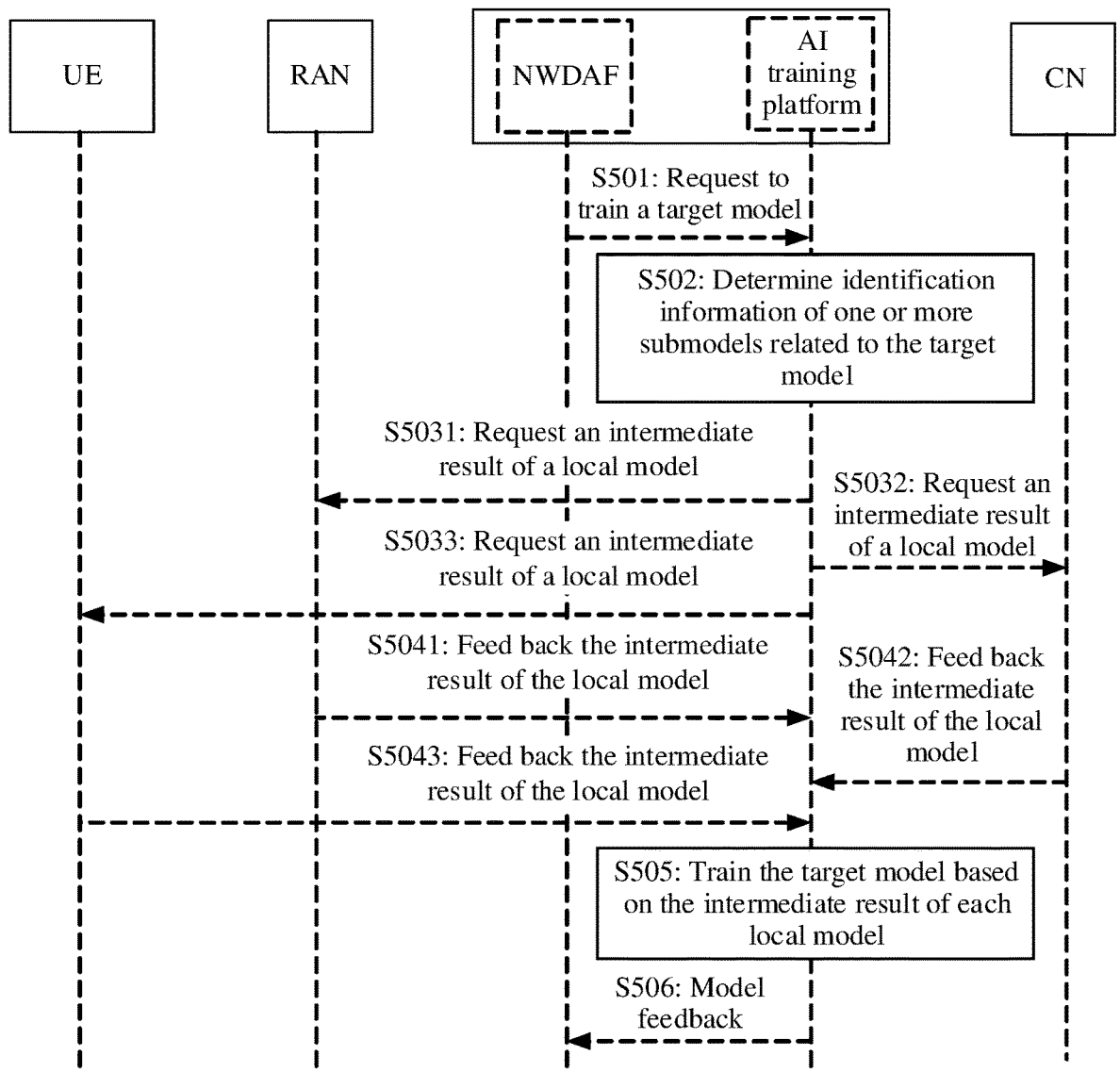
FIG. 5 is a schematic diagram of signaling exchange in a data processing method according to an embodiment of this disclosure.

FIG. 5 is a schematic flowchart of a data processing method according to an embodiment of this disclosure. In this embodiment, an example in which a first network data analytics network element is an AI training platform, and a second network data analytics network element is an NWDAF network element is used for description. When the AI training platform is co-deployed with the NWDAF network element, S501 and S506 may be skipped. When the AI training platform and the NWDAF network element are independent of each other, S501 and S506 may be included. As shown in FIG. 5, the method may include the following steps.

S501: The NWDAF network element requests the AI training platform to train a target model.

In a possible implementation, the NWDAF network element may send a second request message to the AI training platform, to request to train the target model.

For example, the second request message may carry an identifier (which is also referred to as identification information) of the target model, and the identifier of the target model may indicate a specific model that is requested to be trained. A representation form of the identifier of the target model is not limited. For example, the identifier may be of a character string type (for example, ID1=service experience, service MOS, or network performance), a numeric type (for example, an integer type ID1=200 or a binary type ID1=010101111), or a text type.

When the NWDAF network element receives a request message that is sent by another network element and that is for requesting an analysis result, if the NWDAF network element determines that the NWDAF network element does not have a related model for providing the analysis result, the NWDAF network element may send the second request message to the AI training platform, to request to train the target model. Alternatively, for example, if the NWDAF network element needs to obtain or update the target model due to a requirement of the NWDAF network element, the NWDAF network element may send the second request message to the AI training platform, to request to train the target model. A specific scenario in which the NWDAF network element is triggered to request the AI training platform to train the target model is not specifically limited in this embodiment of this disclosure.

S502: The AI training platform determines identification information of one or more submodels related to the target model.

In this embodiment of this disclosure, the AI training platform determines a specific submodel that the to-be-trained target model is specifically related to. The submodel may be one or more of a RAN local model, a UE local model, a CN local model, or the like.

In a possible implementation, the AI training platform locally configures (or in other words, internally configures) the one or more submodels related to the target model. For example, the AI training platform locally configures (for example, configures in a network management system OAM) that the target model (for example, a service MOS model) is related to an input data type provided by submodels of a RAN domain, an AMF network element and a UPF network element in a CN domain, and an AF in a third-party domain. In this case, the AI training platform may determine, based on the local configuration, the identification information of the one or more submodels related to the target model.

In a possible implementation, the AI training platform may determine a network element that is related to the target model and that has a confidentiality requirement; and obtain the identification information of the one or more submodels from the network element having the confidentiality requirement. For example, the AI training platform may internally configure a specific domain or network element that cannot provide original training data and a specific domain or network element that can provide original training data. For example, the AI training platform may learn, based on internal configuration information, that the RAN domain cannot provide original training data, that the AMF network element in the CN domain can provide original training data, that the UPF network element in the CN domain cannot provide original training data, and that the AF in the third-party domain cannot provide original training data.

In a possible implementation, the training platform may send a query message to each related domain or network element, to learn whether the related domain or network element can provide original training data, and may further learn of a type of the original training data that the related domain or network element can provide. For example, the training platform sends a query message to an access network element in the RAN domain, and the access network element feeds back whether original training data on an access network side can be provided, and may further feed back a specific access network data type (for example, RSRP) for which original training data can be provided.

In this embodiment of this disclosure, the AI training platform may determine a domain or a network element related to a model identifier ID1. For a related domain or network element that cannot provide original training data, the AI training platform needs to obtain an intermediate result corresponding to a submodel from the domain or the network element.

S503: The AI training platform sends a first request message to a network element corresponding to the identification information of the one or more submodels, where the first request message includes identification information of a submodel corresponding to each network element (where this step is not shown in the figure).

In this embodiment of this disclosure, the identification information of the submodel may be obtained by the AI training platform based on the identifier (for example, ID1) of the target model in the second request message. The identification information of the submodel may be the same as or different from ID1. For example, an identifier of the RAN local model may be ID1 or ID2, and an identifier of the CN local model may be ID1 or ID3. This is not specifically limited in this embodiment of this disclosure.

In this embodiment of this disclosure, the one or more submodels may be separately installed in one or more of UE, a RAN, or a CN. The AI training platform may send a request message to the network element corresponding to the identification information of the submodel, to request an output result of the submodel.

For example, as shown in FIG. 5, when the one or more submodels are installed in the UE, the RAN, and the CN, S503 may include the following steps. S5031: The AI training platform requests, from the RAN, an intermediate result of a submodel in the RAN (where in a training stage, the intermediate result of the submodel may be referred to as an intermediate training result). S5032: The AI training platform requests, from the CN, an intermediate result of a submodel in the CN. S5033: The AI training platform requests, from the UE, an intermediate result of a submodel in the UE. In this embodiment of this disclosure, S5031 to S5033 may be performed in any sequence, or may be performed simultaneously. This is not specifically limited in this embodiment of this disclosure.

It may be understood that when the one or more submodels are installed in one or two of the UE, the RAN, and the CN, the AI training platform may request an intermediate result of a submodel from the one or two of the UE, the RAN, and the CN. Details are not described herein.

In a possible implementation, the UE may include a plurality of submodels, the RAN may include a plurality of submodels, and the CN may include a plurality of submodels. When the AI training platform sends the first request message to the UE, the first request message may carry identification information of the plurality of submodels corresponding to the UE. When the AI sends the first request message to the RAN, the first request message may carry identification information of the plurality of submodels corresponding to the RAN. When the AI sends the first request message to the CN, the first request message may carry identification information of the plurality of submodels corresponding to the CN. This is not specifically limited in this embodiment of this disclosure.

In a possible implementation, when the first request message is sent to one of the network elements, the first request message may include an identifier of one or more submodels corresponding to the network element. The first request message may alternatively include the identification information of all the submodels determined in S502. This is not specifically limited in this embodiment of this disclosure.

S504: The AI training platform receives a first response message sent by the network element corresponding to the identification information of the one or more submodels, where the first response message includes a first output result obtained through calculation by each network element by using the submodel (where this step is not shown in the figure).

In this embodiment of this disclosure, after receiving the first request message from the AI training platform, the network element corresponding to the one or more submodels may collect related local training data, perform local model training, and obtain a corresponding intermediate result through calculation.

For example, the RAN learns, based on ID2, that the training platform specifically requests the local model ID2 of the RAN. The RAN collects RAN domain-related sample data $x_i^A$ (where i=1, 2, 3 . . . , or m) based on ID2, where i represents an $i^{th}$ sample object, and $x_i^A$ is a sample data vector (which may also be sample data) of the RAN domain corresponding to the $i^{th}$ sample object, for example, an RSRP value, an RSRQ value, and an SINR value of UEi in the RAN domain. The RAN domain generates, based on the sample data $x_i^A$, a local model through local training. For example, the local model generated by the RAN domain is a linear model $f(x)=\theta_A x^A$, where $\theta_A$ is a weight vector, and $x^A$ is sample data. Further, for the sample data $x_i^A$ of each sample object i, the RAN obtains a value of $\theta_A x_i^A$ through calculation based on the linear model $f(x)=\theta_A x^A$, and the value is used as a first output result corresponding to the local model of the RAN. It may be understood that the RAN domain may alternatively generate a model in another algorithm form, for example, a neural network representation form. This is not specifically limited in this embodiment of this disclosure.

For example, the CN learns of, based on ID3, a specific local model of the CN requested by the training platform. The CN collects CN domain-related sample data $x_i^B$ (where i=1, 2, 3 . . . , or m) based on ID3, where i represents an $i^{th}$ sample object, and $x_i^B$ is a sample data vector of the CN domain corresponding to the $i^{th}$ sample object, for example, a QFBR value, a QFPD value, and a QFPER value of UEi in the CN domain. The CN domain generates, based on a large amount of sample data $x_i^B$, a local model through local training. For example, the local model generated by the CN domain is a linear model $g(x)=\theta_B x^B$, where $\theta_B$ is a weight vector, and $x^B$ is a sample data vector. Further, for the sample data $x_i^B$ of each sample object i, the CN obtains a value of $\theta_B x_i^B$ through calculation based on the linear model $g(x)=\theta_B x^B$, and the value is used as a first output result corresponding to the local model of the CN. It may be understood that the CN domain may alternatively generate a model in another algorithm form, for example, a neural network representation form. This is not specifically limited in this embodiment of this disclosure.

In this embodiment of this disclosure, the AI training platform may receive the first response message sent by the network element corresponding to the identification information of the one or more submodels. The first response message sent by each network element may include the first output result obtained through calculation by using the submodel of the network element.

For example, as shown in FIG. 5, when the one or more submodels are installed in the UE, the RAN, and the CN, S504 may include the following steps. S5041: The AI training platform receives, from the RAN, a first output result of the submodel in the RAN. S5042: The AI training platform receives, from the CN, a first output result of the submodel in the CN. S5043: The AI training platform receives, from the UE, a first output result of the submodel in the UE. In this embodiment of this disclosure, S5041 to S5043 may be performed in any sequence, or may be performed simultaneously. This is not specifically limited in this embodiment of this disclosure.

It may be understood that when the one or more submodels are installed in one or two of the UE, the RAN, and the CN, the AI training platform may receive the first output result of the submodel from the one or two of the UE, the RAN, and the CN. Details are not described herein.

S505: The AI training platform obtains the target model through training based on the first output result fed back by each network element.

In this embodiment of this disclosure, the AI training platform may perform training based on a possible implementation of model training by using the first output result as an input, to obtain the target model.

In a possible implementation, the AI training platform may associate, by using association information reported by the domains or the network elements, the intermediate results reported by the domains or the network elements. For example, $\theta_A x_i^A$ and $\theta_B x_i^B$ of the $i^{th}$ sample object are associated. If the AI training platform has other original training data of the $i^{th}$ sample object, for example, $x_i^C$=(UEi location, AMF resource usage, Num of UEs), the AI training platform may also associate the collectable original training data of the $i^{th}$ sample object with the intermediate result. The AI training platform may obtain complete sample data of the $i^{th}$ sample object by associating the intermediate results of the parts and the original training data, and subsequently use the complete sample data as sample input data in a model training process.

The AI training platform may obtain, through calculation, an output result corresponding to the sample input data; and obtain, through calculation, a loss function difference between the output result corresponding to the sample input data and label data. For example, the target model is a linear model:

$$y^* = h(x) = g(x) + f(x) + \ldots + \theta_C x^C.$$

If sample data includes $g(x_i)$ reported by the RAN, $f(x_i)$ reported by the CN, and originally reported data $x_i^C$ obtained by the AI training platform, an output result of the model is $y_i^* = h(x_i) = g(x_i) + f(x_i) + \ldots + \theta_C x_i^C$. The AI training platform may obtain, through calculation, a loss difference di between a value of $y_i^*$ and a value of an associated label value $y_i$ based on an existing loss function, for example, obtain, through calculation, a sum of squared differences of the two as the loss difference.

In a possible implementation, if the loss difference di does not meet a preset requirement (for example, the loss difference should be less than or equal to 0.001), the training platform updates and iterates the existing target model. For example, a function relationship between the parameters in the $h(x)$ function or between the parts (for example, the intermediate results $g(x)$, $f(x)$, and $x_i^C$) is adjusted, for example, a linear relationship is replaced with an exponential relationship. It may be understood that the AI training platform may specifically use an existing machine learning-related method, for example, a gradient update method, to update and iterate the existing target model. This is not specifically limited in this embodiment of this disclosure. If the loss difference di meets the preset requirement, a model iteration process ends, and the AI training platform may obtain the target model (for example, a relational model between the sample input data and the label data).

For example, a target model that corresponds to a voice service MOS and that is obtained by the AI training platform is a linear model, which is the following functional relational expression:

$$y = h(x) = g(x) + f(x) + \ldots + \theta_C x^C.$$

$g(x)$ is an intermediate result corresponding to the local model reported by the CN domain (where the intermediate result may be referred to as an intermediate inference result in an inference stage), $f(x)$ is an intermediate result corresponding to the local model reported by the RAN domain, and $x^C$ is original training data that can be obtained by the AI training platform.

It should be noted that the target model finally obtained by the AI training platform through training may be a function relationship in another form, for example, an exponential relationship, a reciprocal relationship, or a neural network relationship, in addition to the foregoing model in which the linear relationship is used as an example. For example, the RAN domain and the CN domain respectively report intermediate results $g(x)$ and $f(x)$, and the training platform may locally obtain some originally reported data $x_i^C$. The target model obtained by the AI training platform may be uniformly expressed by using the following function relationship:

$$Y = h[g(x), f(x), x^C].$$

In a possible implementation, if the loss difference di still does not meet the preset requirement, the AI training platform may feed back the loss function difference (which may also be referred to as a loss difference) to the network element (which may also be referred to as a local domain or network element) corresponding to the identification information of the one or more submodels, so that the network element corresponding to the identification information of the one or more submodels updates the one or more submodels based on the loss function difference.

For example, for each sample object i, the AI training platform feeds back the loss difference di to each local domain or network element. After receiving the loss difference di, each local domain or network element may update and iterate a locally trained model based on the loss difference. For example, the RAN domain updates the weight vector parameter $\theta_A$ in $f(x) = \theta_A x^A$ based on di. For example, $\theta_A$ may be updated according to a common machine learning method, for example, a gradient update method. This is not specifically limited in this embodiment of this disclosure. Then, steps S504 and S505 are repeatedly performed until the target model of the AI training platform is converged.

In a possible implementation, the AI training platform may further feed back, to each local domain and network element, association information of the sample object i corresponding to di. The association information is used by each domain and network element to associate di with sample data (for example, $x_i^A$ or $x_i^B$) of the sample object i.

In a possible implementation, the AI training platform may further send at least one of the following information to each local domain and network element: local model identification information and iteration quantity information.

S506: The AI training platform feeds back the target model to the NWDAF network element.

In a possible implementation, the AI training platform sends a second response message to the NWDAF network element, where the second response message includes the target model or address information of the target model. The NWDAF network element may obtain the target model based on the second response message for subsequent analysis and inference.

For example, the second response message includes a model result of the target model. A manner in which the model result is carried is not limited, and the model result may be carried in an interface message form or a file form. The model result may specifically include one or more of the following items: model identification information, algorithm information used by the model, an algorithm parameter value, model input data, and model output data. The algorithm information used by the model indicates an algorithm (such as a neural network algorithm or a linear regression algorithm) used between various types of input data and output data and other additional algorithm information (such as a hidden layer quantity or an activation function). For example, in the foregoing example, a model result corresponding to ID1 is $h(x)$, where the used algorithm information is the linear regression, the algorithm parameter value is $(1, 1, 1(\theta_c))$, the input data is $f(x)$, $g(x)$, and $x_i^C$, and the output data is $h(x)$.

In conclusion, in this embodiment of this disclosure, when a plurality of network elements do not exchange original data, a data analytics network element (for example, the AI training platform) may train a target model by using an output result that is obtained through calculation by the plurality of network elements and that reflects a value of impact of a local model in the network element on the target model, to avoid data leakage and obtain a comprehensive and accurate target model, so that functions such as accurate data collection, data analysis, and data training can be provided.

Based on the embodiment corresponding to FIG. 5, in a possible implementation, the first request message may include one or more of the following information: first slice identification information, first service identification information, first area information, first time information, first terminal identification information, first network device identification information, first model training algorithm information, first model feedback validity time information, or first model convergence condition information.

For example, the first slice identification information indicates to provide an output result corresponding to the first slice identification information, and the output result is an intermediate result corresponding to a local model.

For example, the first service identification information indicates to provide an output result corresponding to the first service identification information.

For example, the first area information indicates to provide an output result corresponding to the first area information.

For example, the first time information indicates to provide an output result corresponding to the first time information.

For example, the first terminal identification information indicates to provide an output result corresponding to the first terminal identification information.

For example, the first network device identification information indicates to provide an output result corresponding to the first network device identification information. For example, the first model training algorithm information is for recommending a model training algorithm to be used for a submodel.

For example, the first model feedback validity time information indicates a validity time period for feeding back an output result.

For example, the first model convergence condition information indicates a submodel training convergence condition, for example, a loss difference of the submodel is less than a preset value.

The output result is a corresponding intermediate result output by a local domain or network element based on a local submodel.

Based on the embodiment corresponding to FIG. 5, in a possible implementation, the first response message further includes one or more of the following: the identification information of the submodel, association information, a quantity N of iterations, second model training algorithm information, second slice identification information, second service identification information, or second area information.

For example, the association information is for associating output results corresponding to different submodels of a same sample object.

For example, the quantity N of iterations indicates that an output result of the network element corresponding to the identification information of the submodel is a result generated in an $N^{th}$ iteration process. The quantity N of iterations helps the AI training platform associate intermediate results of each domain reported in a same iteration process.

For example, the second model algorithm information indicates an algorithm used by the network element corresponding to the identification information of the submodel. The information helps the AI training platform select a corresponding algorithm to perform a training process of a target model. For example, if a local network element obtains a submodel by using a neural network algorithm, the local network element may send the corresponding neural network algorithm as the second model algorithm information to the AI training platform in the first response message, so that the AI training platform also uses the neural network algorithm as much as possible to train the target model.

For example, the second slice identification information indicates that the output result of the network element corresponding to the identification information of the submodel includes an output result for the second slice identification information.

For example, the second service identification information indicates that the output result of the network element corresponding to the identification information of the submodel includes an output result for the second service identification information.

For example, the second area information indicates that the output result of the network element corresponding to the identification information of the submodel includes an output result for the second area information.

In a possible implementation, association information for the $i^{th}$ sample object includes one or more of the following information corresponding to the $i^{th}$ sample object: a next generation application protocol (NG-AP) identifier, an N2 tunnel identifier, an N3 tunnel identifier, association time information, a quality of service flow identifier QFI, an internet protocol IP 5-tuple, an international mobile subscriber identity (IMSI), a generic public subscription identifier (GPSI), or a subscriber permanent identifier (SUPI). In a possible understanding, in this implementation, information based on which association is performed may be implicitly indicated. To be specific, when the first response message includes one or more of the NG-AP identifier, the N2 tunnel identifier, the N3 tunnel identifier, the association time information, the quality of service flow identifier QFI, the internet protocol IP 5-tuple, the international mobile subscriber identity IMSI, the general public subscription identifier GPSI, or the subscriber permanent identifier SUPI, it may indicate that the association may be performed on a same sample object based on the information.

In a possible implementation, the association information includes an association indication and one or more of the following information corresponding to the $i^{th}$ sample object: an NG-AP identifier, an N2 tunnel identifier, an N3 tunnel identifier, association time information, a quality of service flow identifier QFI, an internet protocol IP 5-tuple, an international mobile subscriber identity IMSI, a generic public subscription identifier GPSI, or a subscriber permanent identifier SUPI. In a possible understanding, in this implementation, the association indication may explicitly indicate that association is required, and indicate, based on specific information, specific information used for the association. The association indication may be a character, a number, or the like. The association indication is not specifically limited in this embodiment of this disclosure.

Based on the embodiment corresponding to FIG. 5, in a possible implementation, the second request message may include one or more of the following information: third slice identification information, third service identification information, third area information, third time information, third terminal identification information, third network device identification information, third model training algorithm information, third model feedback validity time information, or third model convergence condition information. Each piece of the foregoing information indicates, to the AI training platform, a limited object or range of model training.

For example, the third slice identification information indicates to provide a trained model for a slice, a slice instance, or a slice sub-instance.

For example, the service identification information indicates to provide a trained model for a service.

For example, the area information indicates to provide a trained model for an area.

For example, the time information indicates to provide a trained model in a specific time period.

For example, the terminal identification information (which may be a single terminal identifier, a plurality of terminal identifiers, or a terminal group identifier) indicates to provide a trained model for a terminal.

For example, the network device identification information indicates to provide a trained model for a network device.

For example, the model training algorithm information is for recommending, to the AI training platform, one or more algorithms for model training, such as a neural network algorithm, a linear regression algorithm, a random forest algorithm, and a K-means clustering algorithm. Alternatively, the model training algorithm information is for recommending a specific type in each algorithm class to the training platform, for example, logistic regression in a regression algorithm class.

For example, the model feedback validity time information indicates, to the AI training platform, a validity time period for model feedback. For example, the model feedback validity time information indicates the training platform to feed back a trained model within 24 hours after receiving a request message, and a model that is fed back after 24 hours elapse is considered to be invalid.

For example, the model convergence condition information indicates, to the AI training platform, a condition under which a model is considered to be converged. This may alternatively be understood as indicating a condition under which a training process is completed. For example, AI training platform indicates the training platform to determine that a trained model has been converged when a sum of squared differences between a training target and a label value can be less than or equal to 0.001 by using the trained model.

Based on the embodiment corresponding to FIG. 5, in a possible implementation, the second response message further includes one or more of the following: the third slice identification information, the third service identification information, the third area information, the third time information, the third terminal identification information, the third network device identification information, or model training complete indication information.

The model training complete indication information indicates that a model training stage is completed. For specific content of other information, refer to the descriptions of the second request message. Details are not described herein again.

It should be noted that, in this embodiment of this disclosure, there may or may not be an intersection set between information included in the first request message, information included in the second request message, information included in the first response message, and information included in the second response message. This is not specifically limited in this embodiment of this disclosure.

Figure 6:
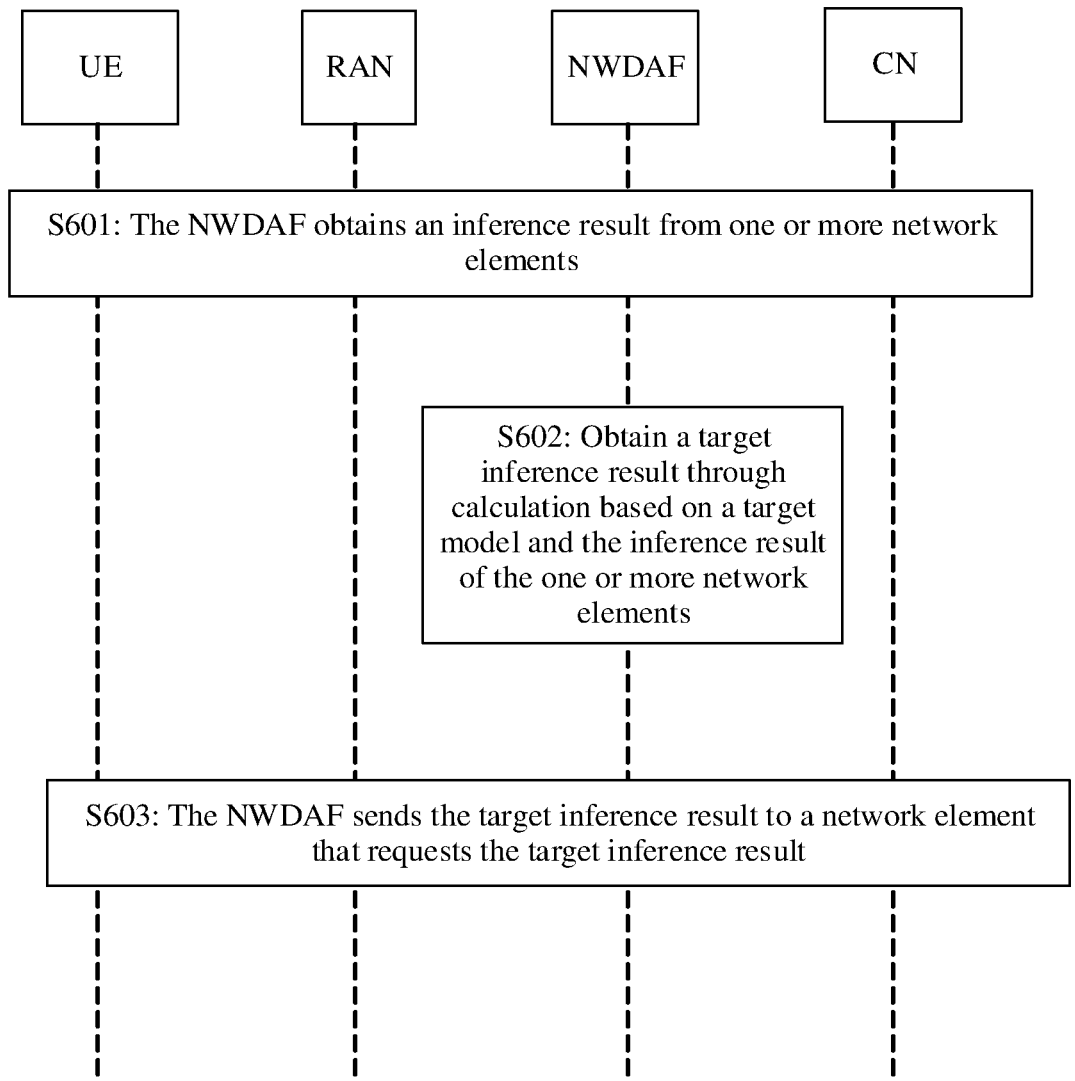
FIG. 6 is a schematic diagram of signaling exchange in another data processing method according to an embodiment of this disclosure.

After obtaining the target model, the NWDAF network element may perform an analysis and inference process. For example, FIG. 6 is a schematic diagram of analysis and inference according to an embodiment of this disclosure. The process may include the following steps.

S601: An NWDAF network element obtains an inference result from one or more network elements, where the inference result is obtained through calculation by the one or more network elements by using a submodel, and the inference result reflects a value of impact of the submodel on a target model of the second network data analytics network element.

In a possible understanding, a first output result is a result obtained through calculation based on a submodel in a target model training stage, and the inference result is a result obtained through calculation based on the submodel in an inference stage.

In a possible implementation, the NWDAF network element may automatically trigger to obtain the inference result from the one or more network elements, to feed back a target inference analysis result for the one or more network elements.

In a possible implementation, the NWDAF network element may obtain the inference result from the one or more network elements based on triggering by another network element.

For example, when a trigger condition (where the trigger condition is not limited in this embodiment of this disclosure) is met, a first network element (for example, a gNB, UE, or a network element in a CN) collects local data related to a sample object j, and obtains a local intermediate result through calculation based on a local model that has been trained by the first network element. For example, in a process of performing a voice service by UEj, if the UEj triggers measurement and reports a measurement report, a RAN determines, based on the measurement report, that cell handover is to be performed for the UE. Based on the trigger condition, the RAN collects, in real time, local data $x_j^A$ corresponding to a model ID2 (corresponding to a voice service MOS) of the UEj; and obtains a corresponding intermediate result $\theta_A x_j^A$ through calculation based on a local model $f(x)=\theta_A x^A$ that has been iterated and stabilized.

The first network element reports a local intermediate inference result to the NWDAF network element. For example, the gNB reports first information to the NWDAF network element, and the first information includes an intermediate inference result $f(x_j)$. In a possible implementation, the first information carries one or more of the following information: association information of the UEj (for example, an SUPI, an IP 5-tuple, an NG-AP ID, a QFI, or association time information of the UEj), a local model identifier (for example, ID2), and time.

The NWDAF network element associates other corresponding information based on the local model identifier (for example, ID2) reported by the first network element. For example, a model identifier ID3 in a second network element (for example, the CN) is associated based on ID2, and an originally reported data type $x^C$ that needs to be obtained by the NWDAF network element may be further associated.

The NWDAF network element requests, from the second network element, an intermediate inference result corresponding to the model identifier ID3. For example, the NWDAF network element sends a request message to the second network element. The request message carries the association information of the UEj (for example, the SUPI, the IP 5-tuple, the NG-AP ID, or the QFI of the UEj), the model identifier ID3, and time, so that the CN domain learns of a specific object that needs to obtain data in real time and a type of the to-be-obtained data. For example, the CN domain learns, based on the SUPI and ID3, that $x_j^B$ of the UEj needs to be obtained in real time, and $g(x_j)=\theta_B x_j^B$ is obtained through calculation.

The second network element feeds back, to the NWDAF network element, an intermediate inference result obtained through calculation based on a local model. For example, the CN reports, to the NWDAF network element, a feedback message including the intermediate inference result $g(x_j)$. In a possible implementation, the feedback message carries one or more of the following information: the association information of the UEj (for example, the SUPI, the IP 5-tuple, the NG-AP ID, or the QFI of the UEj), the local model identifier (for example, ID3), and time.

S602: The NWDAF network element obtains a target inference result through calculation based on the target model and an intermediate inference result of the one or more network elements.

In this embodiment of this disclosure, the NWDAF network element may obtain, through calculation based on the intermediate inference result reported by the one or more network elements, original data of an inference object (for example, the UEj) obtained by the NWDAF network element, and the like, the target inference result corresponding to the target model.

For example, the NWDAF network element obtains, through calculation based on $g(x_j)$, $f(x_j)$, $x_i^C$, and a target model $h(x)$, an inference value of a voice service MOS corresponding to the UEj, that is, $h(x_j)=g(x_j)+f(x_j)+\ldots+\theta_C x_j^C$.

S603: The NWDAF network element sends the target inference result to the second network element.

The second network element is a network element that subscribes to or uses the target inference result. In this embodiment of this disclosure, the NWDAF may send the target inference result to the second network element in response to a request from the second network element, or the NWDAF may proactively send the target inference result to the second network element without receiving a request from the second network element.

For example, the NWDAF network element may feed back an online inference value corresponding to the voice service MOS to the RAN, so that the RAN determines, based on an obtained real-time voice service experience MOS value, whether to perform handover for the UEj.

In conclusion, in this embodiment of this disclosure, an offline training and online inference method may be used, so that a precision requirement corresponding to a data analysis result is met when no original data of each domain is exchanged, to resolve a problem of inaccurate inference caused by data isolation and a security problem.

The foregoing describes the method in embodiments of this disclosure with reference to FIG. 4 to FIG. 6. The following describes an apparatus that is provided in embodiments of this disclosure and that performs the foregoing method. A person skilled in the art may understand that the method and the apparatus may be mutually combined and referenced. A data processing apparatus provided in embodiments of this disclosure may perform the steps performed by the first network data analytics network element in the foregoing data processing method. Another data processing apparatus may perform the steps performed by the second network data analytics network element in the data processing method in the foregoing embodiments.

Descriptions are provided below by using an example in which functional modules are obtained through division based on corresponding functions.

Figure 7:
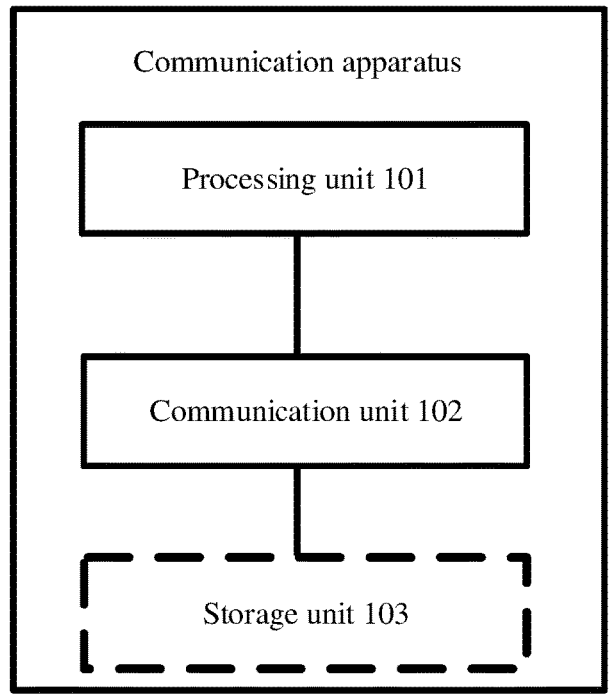
FIG. 7 is a schematic diagram of a structure of a data processing apparatus according to an embodiment of this disclosure.

FIG. 7 is a schematic diagram of a structure of a data processing apparatus according to an embodiment of this disclosure. The data processing apparatus may be a first network data analytics network element or a second network data analytics network element in embodiments of this disclosure, or may be a chip applied to the first network data analytics network element or the second network data analytics network element. The data processing apparatus includes a processing unit 101 and a communication unit 102. The communication unit 102 is configured to support the data processing apparatus in performing a step of sending or receiving information. The processing unit 101 is configured to support the data processing apparatus in performing a step of processing information.

In an example, the data processing apparatus is the first network data analytics network element or the chip or a chip system applied to the first network data analytics network element. The communication unit 102 is configured to support the data processing apparatus in performing S501, S5031, S5032, S5033, S5041, S5042, S5043, and S506 in the foregoing embodiment, performing S601 and S603 in the foregoing embodiment, or the like. The processing unit 101 is configured to support the data processing apparatus in performing S502 and S505 in the foregoing embodiment, performing S602 in the foregoing embodiment, or the like.

In another example, the data processing apparatus is the second network data analytics network element or the chip or a chip system applied to the second network data analytics network element. The processing unit 101 is configured to support the data processing apparatus in performing S502 and S505 in the foregoing embodiment, performing S602 in the foregoing embodiment, or the like. The communication unit 102 is configured to support the data processing apparatus in performing S501, S5031, S5032, S5033, S5041, S5042, S5043, and S506 in the foregoing embodiment, performing S601 and S603 in the foregoing embodiment, or the like.

In a possible embodiment, the data processing apparatus may further include a storage unit 103. The processing unit 101, the communication unit 102, and the storage unit 103 are connected through a communication bus.

The storage unit 103 may include one or more memories. The memory may be a component configured to store a program or data in one or more devices or circuits.

The storage unit 103 may exist independently, and is connected to the processing unit 101 of the data processing apparatus through the communication bus. The storage unit 103 may alternatively be integrated with the processing unit.

The data processing apparatus may be used in a communication device, a circuit, a hardware component, or a chip.

For example, the data processing apparatus may be the chip or the chip system of the first network data analytics network element or the second network data analytics network element in embodiments of this disclosure. The communication unit 102 may be an input/output interface, a pin, a circuit, or the like. For example, the storage unit 103 may store computer-executable instructions of the method of the first network data analytics network element side or the second network data analytics network element side, so that the processing unit 101 performs the method of the first network data analytics network element or the second network data analytics network element in the foregoing embodiments. The storage unit 103 may be a register, a cache, a RAM, or the like, and the storage unit 103 may be integrated with the processing unit 101. The storage unit 103 may be a ROM or another type of static storage device that can store static information and instructions, and the storage unit 103 may be independent of the processing unit 101.

An embodiment of this disclosure provides a data processing apparatus. The data processing apparatus includes one or more modules, configured to implement the method according to any one of the embodiments corresponding to FIG. 4 to FIG. 6. The one or more modules may correspond to the steps of the method according to any one of the embodiments corresponding to FIG. 4 to FIG. 6. Specifically, in this embodiment of this disclosure, for each step in the method performed by the first network data analytics network element, there is a unit or module for performing each step in the method in the first network data analytics network element; and for each step in the method performed by the second network data analytics network element, there is a unit or module for performing each step in the method in the second network data analytics network element. For example, a module that controls or processes an action of the data processing apparatus may be referred to as a processing module. A module that performs a step of processing a message or data on the data processing apparatus side may be referred to as a communication module.

Figure 8:
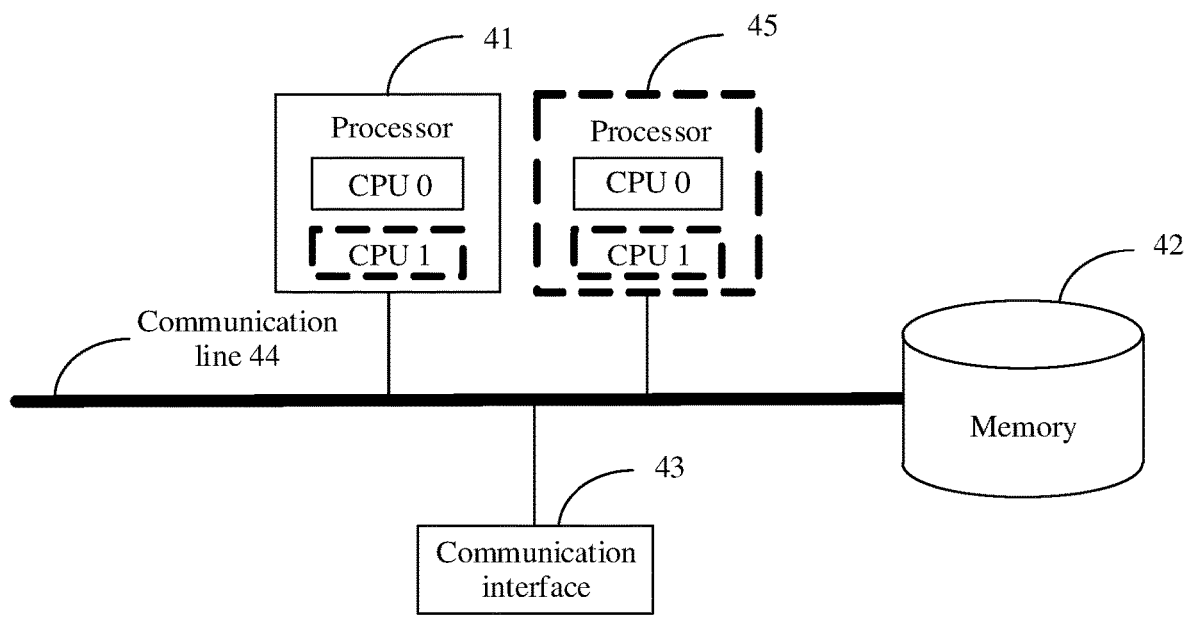
FIG. 8 is a schematic diagram of a structure of a data processing device according to an embodiment of this disclosure.

FIG. 8 is a schematic diagram of a hardware structure of a data processing device according to an embodiment of this disclosure. For hardware structures of the first network data analytics network element and the second network data analytics network element in embodiments of this disclosure, refer to the schematic diagram of the hardware structure of the data processing device in FIG. 8. The data processing device includes a processor 41, a communication line 44, and at least one communication interface (a communication interface 43 is used as an example in FIG. 8 for description).

The processor 41 may be a general-purpose central processing unit (CPU), a microprocessor, an application-specific integrated circuit (ASIC), or one or more integrated circuits configured to control program execution of the solutions of this disclosure.

The communication line 44 may include a path for transferring information between the foregoing components.

The communication interface 43 uses any apparatus such as a transceiver, and is configured to communicate with another device or a communication network such as the Ethernet, a radio access network (RAN), or a wireless local area network (WLAN).

Possibly, the communication device may further include a memory 42.

The memory 42 may be a read-only memory (ROM), another type of static storage device that can store static information and instructions, a random access memory (RAM), or another type of dynamic storage device that can store information and instructions; or may be an electrically erasable programmable read-only memory (EEPROM), a compact disc read-only memory (CD-ROM), another compact disc storage, an optical disc storage (including a compact disc, a laser disc, an optical disc, a digital versatile disc, a Blu-ray disc, or the like), a magnetic disk storage medium, another magnetic storage device, or any other medium that can be used to carry or store expected program code in a form of an instruction or a data structure and that can be accessed by a computer. However, the memory 42 is not limited thereto. The memory may exist independently, and is connected to the processor through the communication line 44. The memory may alternatively be integrated with the processor.

The memory 42 is configured to store computer-executable instructions for executing the solutions of this disclosure, and the processor 41 controls the execution. The processor 41 is configured to execute the computer-executable instructions stored in the memory 42, to implement a data processing method provided in the following embodiments of this disclosure.

Possibly, the computer-executable instructions in this embodiment of this disclosure may also be referred to as application program code. This is not specifically limited in this embodiment of this disclosure.

During specific implementation, in an embodiment, the processor 41 may include one or more CPUs, for example, a CPU 0 and a CPU 1 in FIG. 8.

During specific implementation, in an embodiment, the communication device may include a plurality of processors, for example, the processor 41 and a processor 45 in FIG. 8. Each of the processors may be a single-core (single-CPU) processor, or may be a multi-core (multi-CPU) processor. The processor herein may be one or more devices, circuits, and/or processing cores configured to process data (for example, computer program instructions).

For example, a data processing apparatus is a first network data analytics network element or a chip applied to the first network data analytics network element. The communication interface is configured to support the data processing apparatus in performing S501, S5031, S5032, S5033, S5041, S5042, S5043, and S506 in the foregoing embodiment, performing S601 and S603 in the foregoing embodiment, or the like. The processor 41 or the processor 45 is configured to support the data processing apparatus in performing S502 and S505 in the foregoing embodiment, performing S602 in the foregoing embodiment, or the like.

In another example, a data processing apparatus may be a second network data analytics network element or a chip or a chip system applied to the second network data analytics network element. The communication interface is configured to support the data processing apparatus in performing S501, S5031, S5032, S5033, S5041, S5042, S5043, and S506 in the foregoing embodiment, performing S601 and S603 in the foregoing embodiment, or the like. The processor 41 or the processor 45 is configured to support the data processing apparatus in performing S502 and S505 in the foregoing embodiment, performing S602 in the foregoing embodiment, or the like.

Figure 9:
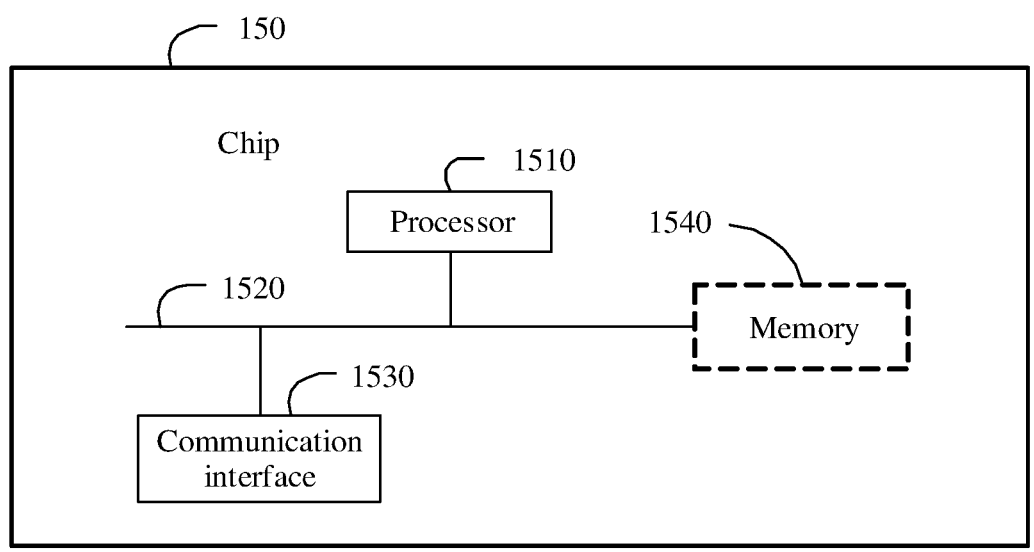
FIG. 9 is a schematic diagram of a structure of a chip according to an embodiment of this disclosure.

FIG. 9 is a schematic diagram of a structure of a chip 150 according to an embodiment of the present invention. The chip 150 includes one or more including two) processors 1510 and a communication interface 1530.

In a possible embodiment, the chip 150 shown in FIG. 9 further includes a memory 1540. The memory 1540 may include a read-only memory and a random access memory, and provide operation instructions and data for the processor 1510. A part of the memory 1540 may further include a non-volatile random access memory (NVRAM).

In some implementations, the memory 1540 stores the following elements: an executable module or a data structure, a subset thereof, or an extended set thereof.

In this embodiment of the present invention, a corresponding operation is performed by invoking the operation instructions stored in the memory 1540 (where the operation instructions may be stored in an operating system).

In a possible implementation, structures of chips used by a first network data analytics network element and a second network data analytics network element are similar, and different apparatuses may use different chips to implement respective functions.

The processor 1510 controls an operation of the first network data analytics network element or the second network data analytics network element, and the processor 1510 may also be referred to as a central processing unit (CPU). The memory 1540 may include the read-only memory and the random access memory, and provide the instructions and the data for the processor 1510. A part of the memory 1540 may further include a non-volatile random access memory (NVRAM). For example, in an application, the memory 1540, the communication interface 1530, and the processor 1510 are coupled together through a bus system 1520. The bus system 1520 may further include a power bus, a control bus, a status signal bus, and the like in addition to a data bus. However, for clear description, various buses are marked as the bus system 1520 in FIG. 9.

The foregoing communication unit may be an interface circuit or a communication interface of the apparatus, and is configured to receive a signal from another apparatus. For example, when the apparatus is implemented as a chip, the communication unit is an interface circuit or a communication interface that is of the chip and that is configured to receive a signal from or send a signal to another chip or apparatus.

The method disclosed in the foregoing embodiments of the present invention may be applied to the processor 1510, or implemented by the processor 1510. The processor 1510 may be an integrated circuit chip, and has a signal processing capability. In an implementation process, the steps in the foregoing method may be implemented by using a hardware integrated logic circuit in the processor 1510, or by using instructions in a form of software. The processor 1510 may be a general-purpose processor, a digital signal processor (DSP), an application-specific integrated circuit (ASIC), a field-programmable gate array (FPGA), another programmable logic device, a discrete gate or transistor logic device, or a discrete hardware component. The processor 1510 may implement or perform the methods, the steps, and logical block diagrams that are disclosed in embodiments of the present invention. The general-purpose processor may be a microprocessor, or the processor may be any conventional processor or the like. Steps of the methods disclosed with reference to embodiments of the present invention may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1540, and the processor 1510 reads information in the memory 1540 and completes the steps in the foregoing methods in combination with hardware of the processor 1510.

In a possible implementation, the communication interface 1530 is configured to perform the steps of receiving and sending performed by the first network data analytics network element or the second network data analytics network element in the embodiments shown in FIG. 4 to FIG. 6. The processor 1510 is configured to perform the step of processing performed by the first network data analytics network element or the second network data analytics network element in the embodiments shown in FIG. 4 to FIG. 6.

In embodiments, the instructions that are stored in the memory and that are to be executed by the processor may be implemented in a form of a computer program product. The computer program product may be written into the memory in advance, or may be downloaded and installed in the memory in a form of software.

The computer program product includes one or more computer instructions. When the computer program instructions are loaded and executed on a computer, all or a part of the procedures or functions according to embodiments of this disclosure are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Embodiments of this disclosure further provide a computer-readable storage medium. The methods described in the foregoing embodiments may be all or partially implemented by software, hardware, firmware, or any combination thereof. If the methods are implemented in the software, functions may be used as one or more instructions or code and stored in the computer-readable medium or transmitted on the computer-readable medium. The computer-readable medium may include a computer storage medium and a communication medium, and may further include any medium that can transfer a computer program from one place to another. The storage medium may be any target medium that can be accessed by a computer.

In a possible implementation, the computer-readable medium may include a RAM, a ROM, an EEPROM, a CD-ROM, another optical disc storage, a magnetic disk storage, another magnetic storage device, or any other medium that is used to carry or store required program code in a form of an instruction or a data structure and that may be accessed by the computer. In addition, any connection is appropriately referred to as a computer-readable medium. For example, if a coaxial cable, an optical fiber cable, a twisted pair, a digital subscriber line (DSL), or wireless technologies (such as infrared, radio, and microwave) are used to transmit software from a website, a server, or another remote source, the coaxial cable, the optical fiber cable, the twisted pair, the DSL, or the wireless technologies such as infrared, radio, and microwave are included in a definition of the medium. Magnetic disks and optical discs used in this specification include a compact disc (CD), a laser disc, an optical disc, a digital versatile disc (DVD), a floppy disk, and a Blu-ray disc. The magnetic disk usually magnetically reproduces data, and the optical disc optically reproduces data by using laser light. The foregoing combinations also need to be included within the scope of the computer-readable medium.

Embodiments of this disclosure further provide a computer program product. The methods described in the foregoing embodiments may be all or partially implemented by software, hardware, firmware, or any combination thereof. If the methods are implemented in the software, the methods may be all or partially implemented in a form of the computer program product. The computer program product includes one or more computer instructions. When the foregoing computer program instructions are loaded and executed on a computer, all or a part of the procedures or functions according to the foregoing method embodiments are generated. The computer may be a general-purpose computer, a dedicated computer, a computer network, a base station, a terminal, or another programmable apparatus.

The objectives, technical solutions, and beneficial effects of the present invention are further described in detail in the foregoing specific implementations. It should be understood that the foregoing descriptions are merely specific implementations of the present invention, but are not intended to limit the protection scope of the present invention. Any modification, equivalent replacement, or improvement made based on the technical solutions of the present invention shall fall within the protection scope of the present invention.

It should be noted that, in embodiments of this disclosure, network elements may also use other definitions or names during specific application. For example, the AI training platform may be referred to as a first data analytics network element or a first core network element, and the NWDAF network element may be referred to as a second data analytics network element or a second core network element. Alternatively, the foregoing two network elements may also be collectively referred to as a data analytics network element or a core network element. Alternatively, other names may be defined for the foregoing two network elements based on actual functions. This is not specifically limited in embodiments of this disclosure.

What is claimed is:

1. A data processing method comprising: determining, by a first network data analytics network element, identification information of one or more submodels related to a target model;
   sending, by the first network data analytics network element, a first request message to a network element corresponding to the identification information of the one or more submodels, wherein the first request message comprises the identification information of the one or more submodels;
   receiving, by the first network data analytics network element, a first response message from the network element, wherein the first response message comprises a first output result obtained through calculation by the network element by using the one or more submodels, and the first output result reflects a value; and
   obtaining, by the first network data analytics network element, the target model through training that is based on the first output result of the network element corresponding to the identification information of the one or more submodels;
   wherein the determining, by the first network data analytics network element, of the identification information of one or more submodels related to the target model comprises:
   determining, by the first network data analytics network element based on a local configuration, the identification information of the one or more submodels related to the target model; or
   determining, by the first network data analytics network element, the network element that is related to the target model and that has a confidentiality requirement; and
   obtaining, by the first network data analytics network element, the identification information of the one or more submodels from the network element having the confidentiality requirement.

2. The method according to claim 1, wherein the first request message further comprises one or more of the following: first slice identification information, first service identification information, first area information, first time information, first terminal identification information, first network device identification information, first model training algorithm information, first model feedback validity time information, or first model convergence condition information, wherein the first slice identification information indicates to provide an output result corresponding to the first slice identification information; the first service identification information indicates to provide an output result corresponding to the first service identification information; the first area information indicates to provide an output result corresponding to the first area information; the first time information indicates to provide an output result corresponding to the first time information; the first terminal identification information indicates to provide an output result corresponding to the first terminal identification information; the first network device identification information indicates to provide an output result corresponding to the first network device identification information; the first model training algorithm information is for recommending a model training algorithm to be used for the one or more submodels; the first model feedback validity time information indicates a validity time period for feeding back an output result; and the first model convergence condition information indicates a model training convergence condition.

3. The method according to claim 1, wherein the first response message further comprises one or more of the following: the identification information of the one or more submodels, association information, a quantity N of iterations, model training algorithm information, slice identification information, service identification information, or area information, wherein
   the association information is for associating output results of a same sample object; the quantity N of iterations indicates that an output result of the network element corresponding to the identification information of the one or more submodels is a result generated in an $N^{th}$ iteration process;
   the model training algorithm information indicates an algorithm used by the network element corresponding to the identification information of the one or more submodels;
   the slice identification information indicates that the output result of the network element corresponding to the identification information of the one or more submodels comprises an output result for the slice identification information;
   the service identification information indicates that the output result of the network element corresponding to the identification information of the one or more submodels comprises an output result for the service identification information; and
   the area information indicates that the output result of the network element corresponding to the identification information of the one or more submodels comprises an output result for the area information.

4. The method according to claim 3, wherein the association information comprises one or more of the following: an interface identifier, an N2 tunnel identifier, an N3 tunnel identifier, association time information, a quality of service flow identifier (QFI), an internet protocol IP 5-tuple, an international mobile subscriber identity (IMSI), a generic public subscription identifier (GPSI), or a subscriber permanent identifier (SUPI); or
   the association information comprises an association indication and one or more of the following information: the interface identifier, the N2 tunnel identifier, the N3 tunnel identifier, the association time information, the quality of service flow identifier (QFI), the internet protocol IP 5-tuple, the international mobile subscriber identity (IMSI), the generic public subscription identifier (GPSI), or the subscriber permanent identifier (SUPI).

5. The method according to claim 1, wherein the obtaining, by the first network data analytics network element, of the target model through training that is based on the first output result of the network element corresponding to the identification information of the one or more submodels comprises:
   inputting, by the first network data analytics network element, the first output result of the network element to a preset model; and
   adjusting, by the first network data analytics network element, the preset model based on a loss function difference between sample label data and an output result of the preset model until the loss function difference between the sample label data and the output result of the preset model meets a condition, to obtain the target model.

6. The method according to claim 1, wherein the method further comprises: sending, by the first network data analytics network element, a loss function difference to the network element corresponding to the identification information of the one or more submodels, wherein the network element corresponding to the identification information of the one or more submodels updates the one or more submodels based on the loss function difference.

7. The method according to claim 1, wherein the method further comprises:
   receiving, by the first network data analytics network element, a second request message from a second network data analytics network element, wherein the second request message is for requesting to train the target model, and the second request message comprises an identifier of the target model.

8. The method according to claim 7, wherein the second request message comprises one or more of the following: slice identification information, service identification information, area information, time information, terminal identification information, network device identification information, model training algorithm information, model feedback validity time information, or model convergence condition information.

9. The method according to claim 7, wherein the method further comprises:
   sending, by the first network data analytics network element, a second response message to the second network data analytics network element, wherein the second response message comprises the target model or address information corresponding to the target model.

10. The method according to claim 9, wherein the second response message further comprises one or more of the following: the slice identification information, the service identification information, the area information, the time information, the terminal identification information, the network device identification information, or model training complete indication information.

11. The method according to claim 1, further comprising:
   receiving, by the first network data analytics network element, an inference result from a first network element, wherein the inference result is obtained by the first network element based on the one or more submodels in the first network element;
   outputting, by the first network data analytics network element, a target inference result based on the target model and the inference result of the first network element; and
   sending, by the first network data analytics network element, the target inference result to a second network element, wherein the second network element is the same as or different from the first network element.

12. An apparatus comprising:
   a memory configured to store program instructions; and
   a processor configured to execute the program instructions to cause the apparatus to:
   determine identification information of one or more submodels related to a target model;
   send a first request message to a network element corresponding to the identification information of the one or more submodels, wherein the first request message comprises the identification information of the one of more submodels;
   receive a first response message from the network element, wherein the first response message comprises a first output result obtained through calculation by the network element by using the one or more submodels, and the first output result reflects a value; and
   obtain the target model through training that is based on the first output result of the network element corresponding to the identification information of the one or more submodels;
   wherein to determine the identification information of the one or more submodels related to the target model, the apparatus further caused to:
   determine, based on a local configuration, the identification information of the one or more submodels related to the target model; or
   determine the network element that is related to the target model and that has a confidentiality requirement; and obtain the identification information of the one or more submodels from the network element having the confidentiality requirement.

13. The apparatus according to claim 12, wherein the processor is configured to execute the program instructions in the memory to cause the apparatus to input the first output result of the network element to a preset model; and adjust the preset model based on a loss function difference between sample label data and an output result of the preset model until the loss function difference between the sample label data and the output result of the preset model meets a condition, to obtain the target model.

14. The apparatus according to claim 12, wherein the processor is configured to execute the program instructions in the memory to cause the apparatus to send a loss function difference to the network element corresponding to the identification information of the one or more submodels, wherein the network element corresponding to the identification information of the one or more submodels updates the one or more submodels based on the loss function difference.

15. The apparatus according to claim 12, wherein the processor is configured to execute the program instructions in the memory to cause the apparatus to receive a second request message from a network data analytics network element, wherein the second request message is for requesting to train the target model, and the second request message comprises an identifier of the target model.

16. The apparatus according to claim 15, wherein the processor is configured to execute the program instructions in the memory to cause the apparatus to send a second response message to the network data analytics network element, wherein the second response message comprises the target model or address information corresponding to the target model.

17. The apparatus according to claim 12, wherein the processor is configured to execute the program instructions in the memory to cause the apparatus to receive an inference result from a first network element, wherein the inference result is obtained by the first network element based on the one or more submodels in the first network element;
- output a target inference result based on the target model and the inference result of the first network element; and
- send the target inference result to a second network element, wherein the second network element is the same as or different from the first network element.

18. A communication system, comprising a first network data analytics network element and a second network data analytics network element, wherein the first network data analytics network element includes a processor and a non-transitory computer-readable storage medium storing instructions executable by the processor such that the first network data analytics network element is at least configured to:
- determine identification information of one or more submodels related to a target model;
- send a first request message to a network element corresponding to the identification information of the one or more submodels, wherein the first request message comprises the identification information of the one or more submodels;
- receive a first response message from the network element, wherein the first response message comprises a first output result obtained through calculation by the network element by using the one or more submodels, and the first output result reflects a value; and
- perform training that is based on the first output result of the network element corresponding to the identification information of the one or more submodels to obtain the target model;
- wherein to determine the identification information of the one or more submodels related to the target model, the first network data analytics network element is further configured to: determine, based on a local configuration, the identification information of the one or more submodels related to the target model; or
- determine the network element that is related to the target model and that has a confidentiality requirement; and
- obtain the identification information of the one or more submodels from the network element having the confidentiality requirement.

19. The communication system according to claim 18, wherein the first network data analytics network element is further configured to is configured to input the first output result of the network element to a preset model; and adjust the preset model based on a loss function difference between sample label data and an output result of the preset model until the loss function difference between the sample label data and the output result of the preset model meets a condition, to obtain the target model.

20. The communication system according to claim 18, wherein the first network data analytics network element is further configured to receive a second request message from the second network data analytics network element, wherein the second request message is for requesting to train the target model, and the second request message comprises an identifier of the target model.

\* \* \* \* \*